United States Patent
Drasny et al.

(10) Patent No.: US 10,318,695 B2
(45) Date of Patent: *Jun. 11, 2019

(54) PHASE ALGEBRA FOR VIRTUAL CLOCK AND MODE EXTRACTION IN HIERARCHICAL DESIGNS

(71) Applicant: International Business Machines Corporation, Armonk, NY (US)

(72) Inventors: Gabor Drasny, Poughkeepsie, NY (US); Gavin B Meil, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/061,601

(22) Filed: Mar. 4, 2016

(65) Prior Publication Data

US 2016/0188785 A1 Jun. 30, 2016

Related U.S. Application Data

(63) Continuation-in-part of application No. 14/631,539, filed on Feb. 25, 2015, which is a continuation-in-part
(Continued)

(51) Int. Cl.
G06F 17/50 (2006.01)

(52) U.S. Cl.
CPC ........ G06F 17/5081 (2013.01); G06F 17/504 (2013.01); G06F 17/505 (2013.01);
(Continued)

(58) Field of Classification Search
CPC ... G06F 17/5022; G06F 17/504; G06F 17/505
(Continued)

(56) References Cited

U.S. PATENT DOCUMENTS

| 5,210,700 A | 5/1993 | Tom |
| 5,452,239 A | 9/1995 | Dai et al. |

(Continued)

FOREIGN PATENT DOCUMENTS

WO 002080046 10/2002

OTHER PUBLICATIONS

"U.S. Appl. No. 14/274,956 Ex Parte Quayle Action", Apr. 10, 2015, 6 pages.
(Continued)

*Primary Examiner* — Phallaka Kik
(74) *Attorney, Agent, or Firm* — DeLizio Law, PLLC

(57) ABSTRACT

A design tool can implement phase algebra based design evaluation to evaluate a circuit design with a compact representation of waveforms without simulating the individual waveforms. The tool can determine that a first sequence of signal transition representations of a first signal of the first module comprises a null sequence. The first module of a register level circuit design comprises a second module, the first module and the second module arranged in a hierarchical order. The tool can determine a second sequence of signal transition representations of a second signal of the second module. Signal transition representations of the first signal are for propagation from the first module to the second module using the second signal. The tool can extract a non-null sequence for the first sequence based on the second sequence to generate an extracted first sequence.

20 Claims, 20 Drawing Sheets

Related U.S. Application Data of application No. 14/327,658, filed on Jul. 10, 2014, now Pat. No. 9,251,304.

(60) Provisional application No. 61/912,345, filed on Dec. 5, 2013.

(52) U.S. Cl.
CPC ...... *G06F 17/5031* (2013.01); *G06F 17/5036* (2013.01); *G06F 17/5022* (2013.01); *G06F 17/5059* (2013.01); *G06F 2217/62* (2013.01); *G06F 2217/84* (2013.01)

(58) Field of Classification Search
USPC ............................ 716/106, 111, 136; 703/16
See application file for complete search history.

(56) References Cited

U.S. PATENT DOCUMENTS

| | | | |
|---|---|---|---|
| 5,862,149 A | 1/1999 | Carpenter et al. | |
| 6,175,946 B1 | 1/2001 | Ly et al. | |
| 6,952,825 B1 | 10/2005 | Cockx et al. | |
| 7,073,146 B2 | 7/2006 | Sarwary et al. | |
| 7,089,518 B2 | 8/2006 | Bair et al. | |
| 7,139,988 B2 | 11/2006 | Chard et al. | |
| 7,243,322 B1 | 7/2007 | Ly et al. | |
| 7,251,794 B2 | 7/2007 | Blanco et al. | |
| 7,299,436 B2 | 11/2007 | Chu et al. | |
| 7,333,926 B2 | 2/2008 | Schuppe | |
| 7,356,789 B2 | 4/2008 | Ly et al. | |
| 7,454,728 B2 | 11/2008 | Ly et al. | |
| 7,484,192 B2 | 1/2009 | Ja et al. | |
| 7,484,196 B2 | 1/2009 | Ja et al. | |
| 7,562,244 B2 | 7/2009 | Wielage | |
| 7,594,200 B2 | 9/2009 | Eisner et al. | |
| 7,877,717 B2 | 1/2011 | Chu et al. | |
| 7,882,473 B2 | 2/2011 | Baumgartner et al. | |
| 7,996,827 B2 | 8/2011 | Vorbach et al. | |
| 8,271,918 B2 | 9/2012 | Kwok et al. | |
| 8,407,636 B2 | 3/2013 | Iwashita | |
| 8,434,047 B1 | 4/2013 | Jiang et al. | |
| 8,438,516 B2 | 5/2013 | Ly et al. | |
| 8,438,517 B2 | 5/2013 | Appleton et al. | |
| 8,448,111 B2 | 5/2013 | Mneimneh et al. | |
| 8,533,541 B2 | 9/2013 | Iwashita | |
| 8,914,761 B2 | 12/2014 | Ly et al. | |
| 8,935,642 B1 | 1/2015 | Bhardwaj et al. | |
| 8,977,995 B1 | 3/2015 | Arora et al. | |
| 9,026,978 B1 | 5/2015 | Liu et al. | |
| 9,251,304 B2 * | 2/2016 | Drasny .............. | G06F 17/5031 |
| 2002/0152060 A1 | 10/2002 | Tseng | |
| 2003/0192018 A1 | 10/2003 | Baumgartner et al. | |
| 2004/0078767 A1 | 4/2004 | Burks et al. | |
| 2005/0268269 A1 | 12/2005 | Coiley | |
| 2007/0168893 A1 | 7/2007 | Watanabe et al. | |
| 2007/0174805 A1 | 7/2007 | Hsu et al. | |
| 2008/0072188 A1 | 3/2008 | Ja et al. | |
| 2009/0106183 A1 | 4/2009 | Estan et al. | |
| 2010/0031209 A1 | 2/2010 | Luan et al. | |
| 2010/0235799 A1 | 9/2010 | Rice et al. | |
| 2011/0197172 A1 | 8/2011 | Yamamoto et al. | |
| 2013/0132760 A1 | 5/2013 | Talupuru et al. | |
| 2013/0246985 A1 | 9/2013 | Ly et al. | |
| 2015/0026654 A1 | 1/2015 | Kwok et al. | |
| 2015/0058818 A1 | 2/2015 | Srinivasan et al. | |
| 2015/0161309 A1 * | 6/2015 | Drasny .............. | G06F 17/5031 716/107 |
| 2015/0161310 A1 * | 6/2015 | Drasny .............. | G06F 17/5031 716/102 |
| 2015/0161311 A1 * | 6/2015 | Drasny .............. | G06F 17/5031 716/107 |
| 2015/0161312 A1 | 6/2015 | Drasny et al. | |
| 2015/0161313 A1 * | 6/2015 | Drasny .............. | G06F 17/5031 716/103 |
| 2015/0161315 A1 | 6/2015 | Meil | |
| 2015/0169816 A1 * | 6/2015 | Drasny .............. | G06F 17/5045 716/107 |
| 2015/0269296 A1 | 9/2015 | Drasny et al. | |
| 2015/0269299 A1 * | 9/2015 | Drasny .............. | G06F 17/5045 716/107 |
| 2015/0370939 A1 * | 12/2015 | Drasny .............. | G06F 17/5031 716/107 |
| 2015/0370940 A1 * | 12/2015 | Drasny .............. | G06F 17/5031 716/108 |
| 2016/0078162 A1 * | 3/2016 | Drasny .............. | G06F 17/5031 716/102 |
| 2016/0188760 A1 * | 6/2016 | Drasny .............. | G06F 17/505 716/104 |
| 2016/0188785 A1 * | 6/2016 | Drasny .............. | G06F 17/5081 716/104 |

OTHER PUBLICATIONS

"U.S. Appl. No. 14/327,658 Office Action", dated Apr. 3, 2015, 9 pages.

Chakrabarty, et al., "Synthesis of Transparent Circuits for Hierarchical and System-On-A-Chip Test", National Science Foundation under grant No. CCR-9875324. pp. 1-6., 2001, 6 pages.

Cummings, "Clock Domain Crossing (CDC) Design & Verification Techniques Using SystemVerilog", SNUG—2008, 2008, 56 pages.

Czeck, et al., "Reliable Design with Multiple Clock Domains", Conference: Formal Methods and Models for Co-Design, 2006. MEMOCODE '06. Proceedings. Fourth ACM and IEEE International Conference on Source: IEEE Xplore, 2006, 10 pages.

Foulon, "Cad Flow for System on Chip", The 13th International Conference on Microelectronics Rabat, Morocco, pp. 241-244, Oct. 29-31, 2001, Oct. 2001, 4 pages.

Hari, et al., "Automatic Constraint Based Test Generation for Behavioral HDL Models", IEEE Transactions on Very Large Scale Integration (VLSI) Systems, vol. 16, No. 4, pp. 408-421, Apr. 2008, Apr. 2008, 14 pages.

Litterick, "Pragmatic Simulation-Based Verification of Clock Domain Crossing Signals and Jitter using SystemVerilog Assertions", Verilab & DVCon; https://www.verilab.com/files/sva_cdc_presentation_dvcon2006.pdf, 2006, 6 pages.

Narain, et al., "Clock Domain Crossing Demystified: The Second Generation Solution for CDC Verification", (Real Intent and Sunburst Design white paper), Mar. 13, 2008., 2008, 20 pages.

Ravi, et al., "TAO: Regular Expression-Based Register-Transfer Level Testability Analysis and Optimization", IEEE Transactions on Very Large Scale Integration (VLSI) Systems, vol. 9, No. 5, pp. 824-832, Dec. 2001, Dec. 2001, 9 pages.

Schubert, et al., "Solutions to IBM POWER8 Verification Challenges", IBM J. Res. & Dev., vol. 59, No. 1, Paper 11, Jan. 2015, pp. 11:1-11:17.

Seshadri, et al., "An Integrated Approach to Behavioral-Level Design-For-Testability Using Value-Range and Variable Testability Techniques", International Test Conference, 1999. pp. 858-867., 1999, 10 pages.

Singh, et al., "Generalized Latency-Insensitive Systems for Single-Clock and Multi-Clock Architectures", Design, Automation and Test in Europe Conference and Exhibition, 2004. Proceedings (vol. 2 ), Feb. 2004, pp. 1008-1013.

Srinivas, et al., "Formal Verification of Digital Circuits Using Hybrid Simulation", IEEE Circuits and Devices Magazine, pp. 19-27, Jan. 1988., Jan. 1988, 9 pages.

Suhaib, "Formal Methods for Intellectual Property Composition Across Synchronization Domains", Dissertation submitted to the Faculty of the Virginia Polytechnic Institute and State University, Aug. 29, 2007, 190 pages.

"U.S. Appl. No. 14/547,953 Final Office Action", dated Nov. 22, 2016, 9 pages.

"U.S. Appl. No. 14/631,539 FAI—OfficeAction Summary", dated Nov. 22, 2016, 7 pages.

"U.S. Appl. No. 14/547,953 FAIIP—OA Summary", May 10, 2016, 12 pages.

(56) References Cited

OTHER PUBLICATIONS

"U.S. Appl. No. 14/631,539 FAIIP PreInterview Communication", May 31, 2016, 24 pages.
"U.S. Appl. No. 14/547,953 Final Office Action", dated Oct. 24, 2017, 6 pages.
"U.S. Appl. No. 14/547,953 Office Action", dated Apr. 20, 2017, 8 pages.
"U.S. Appl. No. 14/631,539 Final Office Action", dated Jun. 1, 2017, 9 pages.
"U.S. Appl. No. 15/061,532 First Action Interview—Pre Interview", dated Jul. 14, 2017, 5 pages.
"U.S. Appl. No. 15/061,532 FAI Office Action Summary", dated Nov. 6, 2017, 10 pages.
"U.S. Appl. No. 15/061,532 Final Office Action", dated Feb. 22, 2018, 14 pages.
"U.S. Appl. No. 15/061,532 Office Action", dated Jun. 14, 2018, 10 pages.
"U.S. Appl. No. 15/061,532 Office Action", dated Jan. 3, 2019, 18 pages.

* cited by examiner

PHASE ALGEBRA FOR VIRTUAL CLOCK AND MODE EXTRACTION IN HIERARCHICAL DESIGNS

RELATED APPLICATIONS

This application is a continuation-in-part of a U.S. patent application Ser. No. 14/631,539, filed on Feb. 25, 2015, entitled "PHASE ALGEBRA FOR ANALYSIS OF HIERARCHICAL DESIGNS." U.S. patent application Ser. No. 14/631,539 is a continuation-in-part of U.S. patent application Ser. No. 14/327,658, filed on Jul. 10, 2014, entitled "CIRCUIT DESIGN EVALUATION WITH COMPACT MULTI-WAVEFORM REPRESENTATIONS," which is incorporated herein by reference. U.S. patent application Ser. No. 14/327,658 claims benefit to U.S. Provisional Application 61/912,345, which was filed on Dec. 5, 2013 and is incorporated by reference in its entirety.

BACKGROUND

Embodiments of the inventive subject matter generally relate to the field of circuit design, and, more particularly, to electronic design automation (EDA) tools to identify potential defects in a register transfer level (RTL) design of a chip or a system on a chip.

EDA tools are used to evaluate chip designs prior to fabrication. The EDA process broadly consists of two steps. The first step is a check of the RTL design logic. The second step is a creation of a physical circuit design from the RTL design. The first step, checking the design logic, can be referred to as RTL design checking. In RTL design checking, a language such as VHDL (Very High Speed Integrated Circuit Hardware Description Language) or Verilog can be used to describe and model the functional behavior of a circuit. RTL design checking itself can be decomposed into two steps. The first step is static checking and the second step is verification, also commonly referred to as dynamic checking. In static checking, the structure of the design is analyzed without simulating the behavior of the design. Conversely, in verification, the design is simulated by applying test patterns or stimulus to the inputs of the design in an attempt to exhaustively identify possible errors. Verification can be an expensive process for a complex chip or system on a chip. Verification can also be inconclusive, since it is often infeasible to apply all possible test patterns to the inputs of a complex design.

Chips and systems on chips continue to increase in complexity, comprising many systems and sub-systems. These systems and sub-systems might comprise multiple clock domains. A clock domain is a set of sequential logic elements, such as transparent latches and flip-flops, and combinational logic associated with these sequential logic elements that are clocked by a common clock or by clocks having a common frequency and a fixed phase relationship. A clock signal causes a change in the state of sequential logic, such as a flip-flop or transparent latch.

SUMMARY

Embodiments of the inventive subject matter include evaluating a circuit design with a compact representation of waveforms without simulating the individual waveforms. A phase algebra based evaluation tool (also referred to as the "tool") can determine that a first sequence of signal transition representations of a first signal of the first module comprises a null sequence. The first module of a register level circuit design comprises a second module, the first module and the second module arranged in a hierarchical order. The tool can determine a second sequence of signal transition representations of a second signal of the second module. Signal transition representations of the first signal are for propagation from the first module to the second module using the second signal. The tool can extract a non-null sequence for the first sequence based on the second sequence to generate an extracted first sequence.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present disclosure. However, it is understood that the described embodiments may be practiced without these specific details. For instance, the syntax employed to implement the disclosure can be varied. Additionally, although illustrations refer to a flip-flop as a fundamental circuit component, embodiments need not include a flip-flop. For example, a circuit model can include transparent latches and an inverter instead of a flip-flop as fundamental circuit components. Additionally, embodiments may implement fewer operations than the operations described herein, while other embodiments might be implemented with more operations than the ones described herein. In other instances, well-known instruction instances, protocols, structures and techniques have not been shown in detail in order not to obfuscate the description.

Modern processors or systems on a chip include multiple components. Identifying as many design defects as possible at the static checking phase of an RTL design check increases the efficiency of the verification process, thereby saving time and money. A circuit design tool can implement a phase algebra based evaluation tool for phase algebra based design evaluation as described herein to efficiently evaluate a circuit design with a compact representation of numerous waveforms without simulating the individual waveforms. Instead of individual waveforms, the phase algebra based design evaluation employs compact representations of a group or set of waveforms. Phase algebra based evaluation constructs representations of a set of waveforms based on relationships among a devised set of functions that account for the various states of a signal over time. Phase algebra based evaluation can efficiently evaluate circuit designs that include hierarchical modules.

Figure 1:
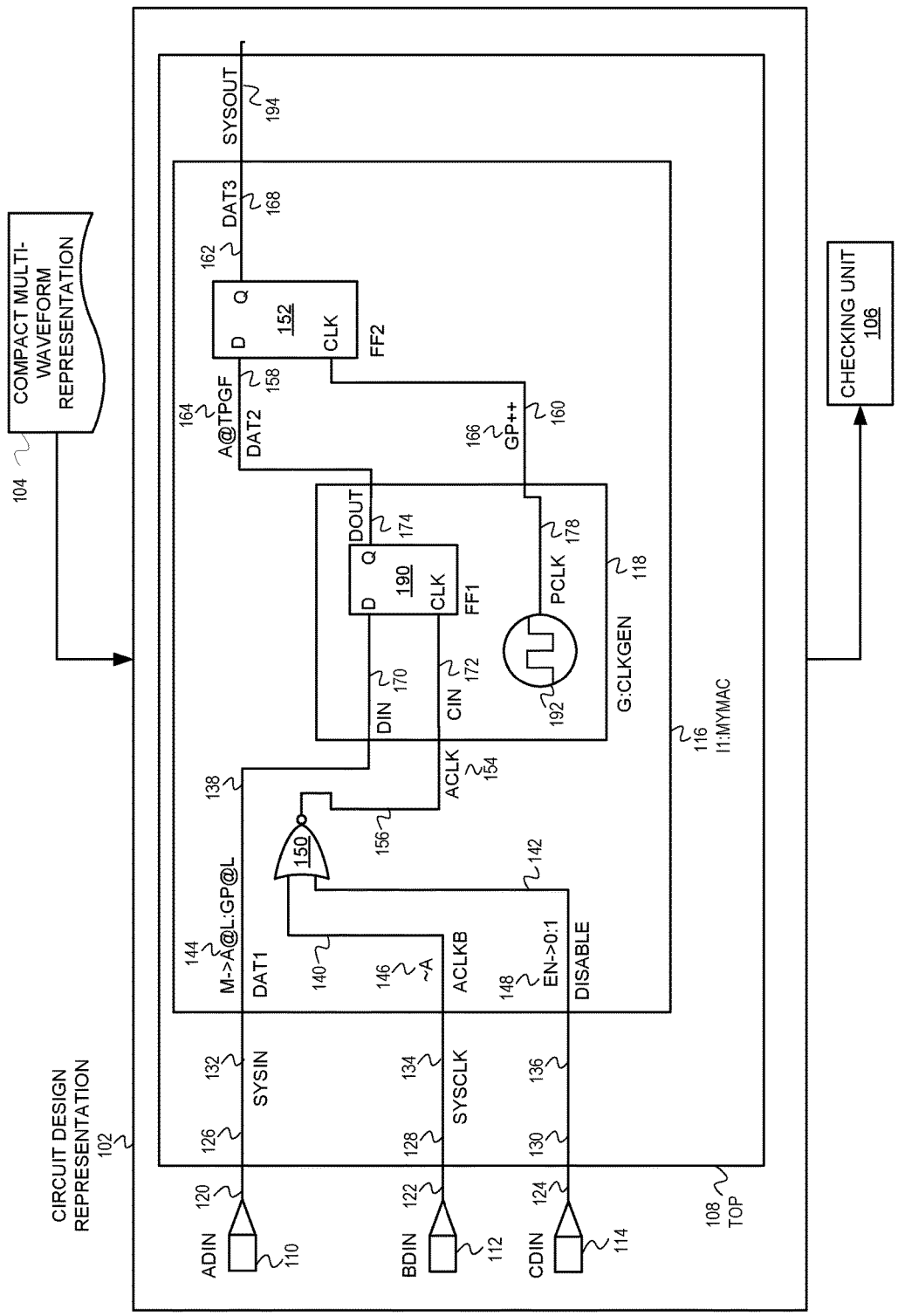
FIG. 1 is a conceptual diagram that depicts example phase algebra based circuit design evaluation with a compact multi-waveform representation.

FIG. 1 is a conceptual diagram that depicts example phase algebra based circuit design evaluation with a compact multi-waveform representation. A circuit design tool performs phase algebra based circuit design evaluation on a machine readable circuit design representation 102 of an RTL circuit design. The circuit design representation 102 includes primary inputs 110, 112, and 114. A primary input is an input to the circuit itself. A primary input is not driven by any component within the circuit. Each of the primary inputs 110 (ADIN), 112 (BDIN), and 114 (CDIN) represents data signals that are provided to the circuit. The circuit design also includes a clock signal PCLK 178 that is generated by a clock generator instance 192.

The circuit design representation 102 of FIG. 1 depicts several modules arranged in hierarchical order. The circuit design representation 102 includes module TOP 108, an instance 116 I1 of module MYMAC (referred to as module instance I :MYMAC 116 or simply module I1:MYMAC 116), and an instance 118 G of module CLKGEN (referred to as module instance G:CLKGEN 118 or simply module G:CLKGEN 118). Module 108 and module instances 116 and 118 are arranged in hierarchical order, such that the module TOP 108 instantiates module MYMAC to generate the module instance I1:MYMAC 116. The module I1:MYMAC 116 instantiates module CLKGEN to generate the module instance G:CLKGEN 118. It is well understood in the field of circuit design that a module instance is the inclusion of a first module within a second module by reference, so that the first module's contents can be reused without duplication.

In the circuit design representation 102, values (e.g., phase expressions in the context of this specification) of signals of the module 108 and module instances 116 and 118 are specified at each level of hierarchy. Thus, values of signals 126, 128, and 130 of the module 108 are specified at the module TOP 108 level. Values of signals 138, 140, and 142 are specified at the module I1:MYMAC 116 level. Values of signals 170, 172, and 178 are specified at the module G:CLKGEN 118 level. Values of signals include sequences of signal transition representations such as phase expressions, which are described below. It is noted that although the term phase expression is used when referring to signal transition representations, other types of compact multi-waveform representations can be used, such as mode expressions, mode independent phase expressions (MIPEs), reduced orthogonal list of condition-MIPE pairs (ROLC-MPs), and/or phase ids.

The phase algebra based evaluation tool (also referred to as the "tool" or the "evaluation tool") can determine two types of mappings when propagating signal transition representations through the circuit design representation 102. The tool can determine specification to usage mappings (also referred to as "specification mappings") that map phase expressions that are specified (e.g., by a designer of a module) at a hierarchy level of a module to phase expressions (i.e., usage phase expressions) that should be propagated through that module (i.e., such as by being propagated from another module). The tool can generate module usages to have modules with two different input phase expressions for the same module. A usage is a version of a module that can have a different set of virtual clocks, modes, and phase expressions relative to other usages of the same module. The tool generates and implements usages in the same manner as described in the U.S. patent application Ser. No. 14/651,539. The tool can also determine hierarchical usage mappings (also referred to as "hierarchical mappings") that are used by the tool for common usages of modules. The hierarchical mapping is for mapping phase expressions (e.g., usage phase expressions) of two signals which are coupled together at boundaries of two modules at two different hierarchy levels.

FIG. 1 depicts the primary inputs 110, 112, and 114 that are representative of the primary inputs throughout the circuit design representation 102 for ease of understanding. Various example RTL circuit design components that can be modeled in an RTL circuit design are described in the U.S. patent application Ser. No. 14/327,658, filed on Jul. 10, 2014, entitled "CIRCUIT DESIGN EVALUATION WITH COMPACT MULTI-WAVEFORM REPRESENTATIONS."

A compact multi-waveform representation 104 is provided for the circuit design representation 102. For example, the compact multi-waveform representation 104 is provided in a RTL description using attributes or in a file supplied as input to the circuit design tool. The circuit design tool determines compact multi-waveform representations generated on nets throughout the RTL circuit design dependent upon the components traversed by the circuit design tool. Example compact multi-waveform representations include notations "A" and "A@L". These notations are referred to as "phase tags" herein. This example uses a phase tag to illustrate handling of virtual clocks identified as "A", "P", and "G.P". A virtual clock represents a source of transitions, such as an oscillator, that may be internal or external to the circuit design being evaluated.

In this description, a phase tag and a phase type are distinguished. A phase type is a construct (e.g., variable or notation) that represents a generic virtual clock. Use of a phase type would be sufficient in a design that contemplates a single virtual clock. A phase tag is a construct that identifies a virtual clock. Although a phase tag can be used in a design that contemplates a single virtual clock, the utility of the phase tag becomes apparent when multiple virtual clocks are being considered, such as a virtual clock "A" and a virtual clock "P". In addition, operators associated with phase tags ("phase tag operators") manipulate results of phase type operators as appropriate for multiple virtual clocks. The particular terminology used to distinguish these constructs should not be used to limit claim scope. For this illustration, the notation "A" represents a set of signals or waveforms with a clock signal behavior corresponding to a virtual clock A. The notation "A@L" represents a set of signals or waveforms corresponding to a latch clocked by the leading edge of the virtual clock identified as A. Similarly, the notation "B" would represent a set of signals or waveforms with a clock signal behavior corresponding to a virtual clock B.

The circuit design representation 102 includes module 108 and module instances 116 and 118 that include, at various hierarchy levels, a clock generator instance 192, flip-flop instances 152 and 190, and a NOR gate instance 150. A net 132 is graphically depicted as connecting output of the primary input 110 to a D input of the flip-flop instance 190. Nets 134 and 136 are graphically depicted as connecting output of the primary inputs 112 and 114, respectively, to inputs of the NOR gate instance 150. Net 156 is graphically depicted as connecting output of the NOR gate instance 150 to a CLK input of the flip-flop instance 190. Net 168 is graphically depicted as connecting Q output of the flip-flop instance 152 to a SYSOUT signal 194.

The tool can determine that propagating the phase expressions "~A" 144 and "EN->0:1" 148 through the NOR gate instance 150 will yield a resultant compact multi-waveform representation of the signal 142. The phase algebra based evaluation tool also determines that inputting other phase expressions into other elements of the circuit design representation will yield other resultant phase expressions. The phase algebra based evaluation tool propagates compact multi-waveform representations (e.g., phase expressions) throughout nets of the circuit design representation 102 using look up tables constructed based, at least in part, on a set of possible waveform states, as described in the U.S. patent application Ser. No. 14/327,658, filed on Jul. 10, 2014, entitled "CIRCUIT DESIGN EVALUATION WITH COMPACT MULTI-WAVEFORM REPRESENTATIONS" and the U.S. patent application Ser. No. 14/547,953, filed on Nov. 19, 2014, entitled "CONDITIONAL PHASE ALGEBRA FOR CLOCK ANALYSIS."

During testing of the hierarchical module TOP 108, the tool evaluates phase expressions as provided for signals of each of the module 108 and module instances 116 and 118. The description below describes various embodiments of how the phase algebra based evaluation efficiently evaluates hierarchical circuit designs that include modules arranged in hierarchical order and where each module can include phase expressions specified at each level of hierarchy.

The circuit design representation 102 includes hierarchical module 108 and module instances 116 and 118. Typically, each such module has a unique module name, and includes named input and output ports through which it communicates with parts of the design outside the module. Thus, a hierarchical design consists of multiple modules organized into a hierarchy through instantiation, or through including one module within another by reference. Such a reference is called a module instance. In a hierarchical design, all names within modules have local scope, meaning that the binding of the name to an object only applies within the module. This applies to instance names, signal names, and to the names of virtual clocks and modes.

Regarding FIG. 1, the circuit design representation 102 also includes several modes. A mode is a Boolean function of the value of a signal in a circuit, referred to as a mode signal. A mode signal can be used to select between a first signal and a second signal, where the second signal is different from the first signal. The modes of the circuit design representation 102 are depicted using phase expressions, which are a higher level construct from phase tags, i.e., a phase expression includes one or more phase tags (or a higher level construct called MIPES that are based on the phase tags) that are joined by a mode expression. The use and nomenclature of the constructs used to represent compact multi-waveform representations is described below with reference to FIG. 2.

One mode of the circuit design representation 102 is depicted by a phase expression "M->A@L:GP@L" 144. The phase expression "M->A@L:GP@L" 144 indicates that the phase expression 144 can be either an "A@L" or a "GP@L" depending on the value of the Boolean function represented by the mode expression "M". For example, the phase expression "M->A@L:GP@L" 144 indicates that the phase expression 144 can be an "A@L" if the Boolean function represented by the mode expression "M" evaluates to the value true, and can be a "GP@L" if the Boolean function represented by the mode expression "M" evaluates to the value false. Other interpretations are possible.

In FIG. 1, module I1:MYMAC 116 contains instances of primitive components and other modules: an instance of a flip-flop named FF2 152 and a NOR gate instance 150, and instance 118 G of module CLKGEN. Each instance is represented by a box in the diagram, also referred as an instance box. The label associated with the box for the clock generator module instance 118 indicates both the instance name G and name of the module being instantiated CLKGEN. The module CLKGEN being instantiated is referred to as the defining module of the CLKGEN module instance 118. The module I1:MYMAC 116 containing the CLKGEN module instance 118 is referred to as the instantiating module of the instance. Similarly, the module G:CLKGEN 118 includes the clock generator instance 192, and another flip-flop instance 190.

The term box refers to either an instance box or a primitive component (also called a primitive box). In one embodiment, the points at which boxes connect to signals are called pins. Ports are points at which signals connect to the external interface of a module. Thus, pins of an instance box correspond to ports of its defining module. The instance box for the module G:CLKGEN 118 in module I1:MYMAC 116 includes pins named DIN, CIN, DOUT and PCLK, which correspond to the ports that have the same name in the defining module CLKGEN. For example, the signal DAT2 158 is connected to output pin DOUT of the instance box of the module G:CLKGEN 118, which corresponds to input port DOUT of the module CLKGEN.

In one embodiment, the phase expressions can be propagated through the hierarchical modules of the circuit design representation 102 by flattening the circuit design representation 102. After the circuit design representation 102 that includes hierarchical modules is flattened, the circuit design representation 102 replaces each instance of a module with the contents of its defining module. The flattened circuit design representation of the circuit design representation 102 includes a copy of each primitive box and signal defined within a module for each global instance of that module. In other embodiments, instead of flattening the circuit design representation 102, propagation of phase expressions through certain modules is reused for multiple instances, resulting in a more efficient and faster propagation of phase expressions through the circuit design representation 102.

The tool may determine whether specification mappings can be determined for specified phase expressions for a signal and a usage phase expression for that signal. The usage phase expression for the signal can be a result from mapping (i.e., using hierarchical mapping) between a pair of signals coupled together at module boundaries of two hierarchy levels (also referred to as a corresponding signals of a corresponding signal pair). With reference to FIG. 1, signals 126 and 138 are corresponding signals, signals 138 and 170 are corresponding signals, signals 128 and 140 are corresponding signals, signals 174 and 158 are corresponding signals, among others. If a specification mapping can be determined, then there is no conflict between phase expressions specified for a signal and a usage phase expression for the signal at the same hierarchy level. For example, a specification mapping can map phase expression 144 (of the signal 138) specified at the module I1:MYMAC 116 to a usage phase expression of signal 138. A hierarchy mapping maps a usage phase expression of signal 132 to the usage phase expression of signal 138.

In certain situations, a specification mapping cannot be determined between the specified and usage phase expressions for a signal. If a specification mapping cannot be determined, then there a conflict between a specified phase expression and a usage phase expression of a certain signal. In one embodiment, the tool can generate an error message that indicates the conflict between the specification and usage phase expressions of a certain signal.

The tool can determine the hierarchical mappings for the usage phase expressions. The tool can use the hierarchical mappings to propagate the usage phase expressions through the circuit design representation 102. For example, the usage phase expressions for signals 138 and 154 propagated to inputs of the G:CLKGEN module instance 118 are "mapped down" to a single set of usage phase expressions at the input ports of defining module CLKGEN. The single set of phase expressions can then be propagated through the defining module CLKGEN. A result of a single set of phase expressions is then "mapped up" at the output ports of the defining module CLKGEN, resulting in two separate phase expressions for signals 164 and 166 that are the outputs of the module instance G:CLKGEN 118.

The tool propagates compact multi-waveform representations throughout nets of the circuit design representation 102 using usages, and performs mapping up and mapping down of phase expressions as described in the U.S. patent application Ser. No. 14/651,539, filed on Feb. 25, 2015, entitled "PHASE ALGEBRA FOR ANALYSIS OF HIERARCHICAL DESIGNS" and the U.S. patent application Ser. No. 14/547,953, filed on Nov. 19, 2014, entitled "CONDITIONAL PHASE ALGEBRA FOR CLOCK ANALYSIS."

The phase algebra based evaluation tool propagates the phase expressions 144, 146, 148, 154, 164, and 166 through the module instances 150, 118, and 152 of the circuit design representation 102 to generate resultant phase expressions. The manner in which the phase expressions are propagated through the circuit design representation 102 is described in more detail below.

When compact multi-waveform representations have been determined, a checking unit 106 of the evaluation tool analyzes the compact multi-waveform representations associated with the nets of the circuit design representation 102. The checking unit 106 can identify defects in the design using these compact multi-waveform representations. For example, the checking unit 106 can evaluate the transition behavior represented by a compact multi-waveform representation associated with a net against a rule or constraint of the net. The rule or constraint of the net can be explicit (e.g., directly defined in association with the net) or implicit (e.g., indirectly associated with the net via a characteristic of the net or at least one of the sinks of the net). For example, the phase expression outputs generated in FIG. 1 (e.g., phase expressions for signals 174 and 162) can be provided to the checking algorithms (such as described with reference to patent application Ser. No. 14/547,953, ) to detect characteristics associated with the design.

Figure 2:
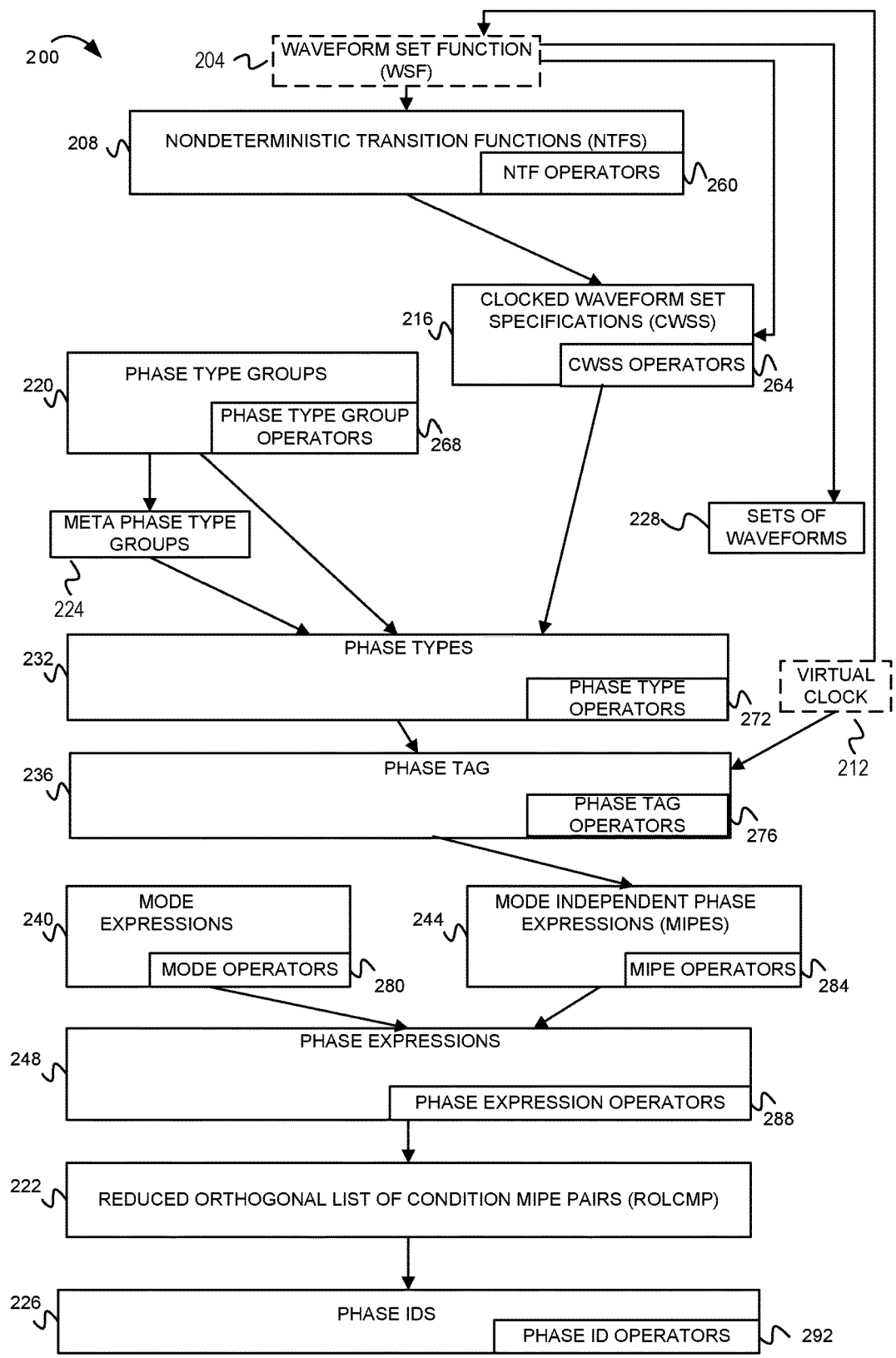
FIG. 2 is a conceptual diagram that depicts an example hierarchy of relationships among data constructs.

A previous state of a signal can be related to multiple possible next states of the signal with a compact representation. Each of these relationships is referred to herein as a nondeterministic transition function ("NTF"). The mapping of time to NTFs can be referred to as a waveform set function (WSF). Each NTF relates a previous state of a waveform or set of waveforms to a set of possible next states. Although separated by a few layers of constructs, the compact multi-waveform representations mentioned earlier are based upon sequences of these NTFs. The NTFs, which can be considered the building blocks, will be first described. Constructs that build upon these NTFs will then be described. FIG. 2 depicts an example hierarchy of data constructs/objects built upon NTFs revealing relationships between the previously mentioned phase tags and NTFs. FIG. 2 will be explored in more detail after describing the data constructs individually. Various example NTFs are described in the U.S. patent application Ser. No. 14/327,658, filed on Jul. 10, 2014.

When propagating compact multi-waveform representations throughout a design, the compact multi-waveform representations are decomposed into the NTFs in order to apply the appropriate NTF operators upon the constituent NTFs. The NTF operators correspond to operations of circuit components (e.g., ntf_and that corresponds to an AND operation of NTFs) and some operations employed for coherency (e.g., ntf_fix_adjacent and ntf_is_subset). The operations can be implemented with look ups, because the look up tables are constructed based on the signal behavior represented by the NTFs and the foundational functions that capture transitional behavior.

Each phase type can be considered a construct (e.g., variable or notation) that represents a set of waveforms as a function of a non-specific virtual clock, as mentioned above. A phase type group represents one or more phase types. For example, the phase type group GCE represents a grouping of two phase types. Phase type groups can be used to differentiate among phase types that have the same Clocked Waveform Set Specification (CWSS).

Phase type operators operate upon the higher level construct of phase types by invoking the operators of lower level constructs. Since phase types correspond to sets of waveforms, the phase type operators represent operations on sets of waveforms. Each phase type is associated with a CWSS and a phase type group. Each CWSS is comprised of NTFs. Each NTF is based upon a WSF, which, in turn, represents a set of multiple waveforms. The phase type group operators can be identified by example function names. The phase type group operators indicate possible output referred to herein as meta phase type groups (meta-PTGs). A meta phase type group is a grouping of phase type groups. Meta phase type groups are implemented to specify results of phase type group operations that conform to the rules specified herein. Phase type groups allow for the compact representations of multiple waveforms because the group identifiers can be used to disambiguate a sequence of nondeterministic signal transition representations that map to multiple phase types.

FIG. 2 is a conceptual diagram that depicts an example hierarchy of relationships among data constructs. Depending on the programming language and particular literature, a data construct can be referred to as a class, an object, a structure, etc. This example data construct 200 includes several elements or members that define the structure of the class and behavior of the class. The structure of this data construct 200 is defined by the following members: NTFs 208, CWSSs 216, phase type groups 220, meta phase type groups 224, phase types 232, phase tags 236, mode expressions 240, mode independent phase expressions (MIPEs) 244, phase expressions 248, reduced orthogonal list of condition-MIPE pairs (ROLCMPs) 222, and phase ids 226. The behavior of the data construct 200 is defined by functions or operators that operate on the depicted members: NTF operators 260, CWSS operators 264, phase type group operators 268, phase type operators 272, phase tag operators 276, mode operators 280, MIPE operators 284, phase expression operators 288, and phase id operators 292.

FIG. 2 depicts a waveform set function (WSF) 204 as supporting the NTF data construct 208. The WSF 204 is depicted with a dashed line because the WSF 204 may not be explicitly defined in a data construct. An NTF data construct can be defined in a class, for example, based on assumptions that rely upon a WSF without explicitly indicating the mappings from each unit of time to an NTF.

A CWSS 216 is a sequence of NTFs 208. Together with a virtual clock 212, a CWSS 216 defines sets of waveforms 228. The virtual clock 212 is also depicted with a dashed line because this may not be explicitly defined in a data construct. The information for a virtual clock (e.g., timing parameters) can be assumed or implied by the CWSS data construct 216. The NTF operators 260 manipulate each NTF 208 that comprises an instance of a CWSS 216, thereby manipulating the CWSS 216 instance.

A user can apply phase tags 236 or phase expressions 248 to the primary inputs and the outputs of clock generators in a circuit design. Operations (i.e., phase tag operators 276 or phase expression operators 288) are performed on these phase tags 236 or phase expressions 248. When the operations are performed, the phase tags 236 or phase expressions 248 are propagated throughout a design, and the resulting phase tags 236 or phase expressions 248 can be analyzed to identify possible design defects or particular design characteristics. A phase tag 236 or phase expression 248 is propagated throughout the circuit design by transforming input phase tags or input phase expressions received at primary inputs and outputs of clock generators in a circuit design through the previously discussed look up tables so that each net of the circuit design is associated with a phase tag 236 or phase expression 248.

A phase type 232 is a generalized version of a phase tag 236. While a phase tag 236 can be associated with a particular virtual clock 212, a phase type 232 is a generalized expression representing a set of waveforms 228 with respect to any virtual clock. As with the other variable types, a phase type 232 can be manipulated through phase type operators 272. A phase type 232 is associated with a clocked waveform set specification (CWSS) 216 and a phase type group 220.

As previously mentioned, multiple phase types 232 can be associated with the same CWSS 216. A phase type group 220 distinguishes such phase types 232, and can distinguish characteristics of signals represented by phase types 232, such as clock signals as compared to data signals. Certain phase type groups 220 can be constituent elements of a meta phase type group 224. Phase type groups 220 and meta phase type groups 224 can be manipulated through phase type group operators 268.

Phase tags 236 and phase expressions 248 themselves are comprised of lower level data constructs (e.g., CWSSs) and also can be converted into different data constructs on which operations are executed. A phase expression 248 is comprised of zero or more mode expressions 240 and one or more MIPEs 244.

A mode expression 240 represents a condition in which a design can operate among multiple modes. A mode is a Boolean function of the value of a signal in the design. A mode can represent a selection between a first signal and a second signal that is different from the first signal. For example, a design might include a dual input multiplexer. A first input to the multiplexer might be a first clock signal and a second input to the multiplexer might be a second clock signal that is asynchronous to the first clock signal. The multiplexer can receive a selector signal that causes it to select between the first signal and the second signal. In the example of FIG. 1, the design includes several modes (e.g., mode M of the phase expression "M->A@L:GP@L"), each of which can be represented via a mode expression 240. Operations can be performed on the mode expressions 240 through the mode operators 280.

A MIPE 244 is comprised of one or more phase tags 236. A MIPE 244 represents a set of waveforms 228 that is a function of the sets of waveforms 228 represented by the constituent phase tags 236 of the MIPE 244. Operations can be performed on a MIPE 244 through the MIPE operators 284.

A phase expression 248 can be converted into a reduced orthogonal list of condition-MIPE pairs 222, designated as a ROLCMP 222. A ROLCMP 222 is a data construct that enables phase expressions 248 to be converted into phase ids 226. A phase id 226 is a numerical handle associated with a phase expression 248, enabling phase expressions 248 to be more easily manipulated. Subsequent sections of this specification describe converting a phase expression 248 into a ROLCMP 222, and converting a ROLCMP 222 into a phase id 226.

A phase tag 236 represents a set of waveforms 228 via CWSSs. In some cases, a phase tag 236 can be associated with a virtual clock 212. Syntactically, if a phase tag 236 is associated with a virtual clock 212, the phase tag will follow a syntax which includes the name of the virtual clock 212.

One such syntax can be represented as "Clock Name@Type of Clock Signal." For example, the phase tag 236 having a value of "A@L" designates the waveform set 228 associated with a latch clocked by the leading phase of virtual clock "A." However, in other cases, a phase tag 236 may not be associated with a virtual clock 212. For instance, the phase tag 236 having a value that includes "*" designates the set of all possible waveforms 228. Phase tags 236 can be manipulated via phase tag operators 276. Phase tag operators 276 implement operations on phase tags 236. A phase tag 236 can be employed to distinguish among a type of signal, such as whether a signal is a clock signal, a data signal (e.g., latch driven signal), or a constant; a type of clock, such as a level, pulse, or delayed clock and inverted versions of each; and a phase of data, such as leading, trailing, or a combination.

As mentioned earlier, a phase type 232 is a generalized expression representing a set of waveforms 228. For example, a phase tag 236 having a value of "A@L" can be generalized to the phase type "C@L," which represents a set of waveforms 228 associated with a leading-phase-clocked latch clocked by any clock C. In some instances, a phase tag 236 conflates with the concept of a phase type 232.

As discussed above, more than one phase type 232 can be represented by identical CWSSs 216. Phase type groups 220 can distinguish phase types 232 that are represented by identical CWSSs 216. Phase type groups 220 can also be implemented to distinguish among classes of signals, such as clock signals, data signals, and combinations of clock and data signals.

Phase expressions 248 can be comprised of mode expressions 240 and MIPES 244. A mode expression 240 is a Boolean function with a mode as its argument. As discussed above, a mode is a Boolean function of the value of a signal in a design. For instance, if a design includes a dual input multiplexer, wherein a first input is a first clock signal and a second input is a second clock signal and a selector signal to the multiplexer causes the multiplexer to select the first or the second clock signal, then a mode expression 240 can represent the conditionality of the multiplexer's output, i.e., that it is either the first clock signal or the second clock signal depending on the selector signal received at the multiplexer. Syntactically, a mode expression 240 can be specified in Backus-Naur form:

```
<mode_expression> ::= <mode_and_expression> |
<mode_expression> "|"
<mode_and_expression>
<mode_and_expression> ::= <mode_prefix_expression> |
<mode_and_expression> "&" <mode_prefix_expression>
<mode_prefix_expression> ::= <mode_primary_expression> | "~"
<mode_prefix_expression>
<mode_primary_expression> ::= <mode> | "0" | "1" |
"("<mode_expression>")".
```

The mode operators 280 comprise the logical functions NOT, AND, OR, and XOR that can take mode expressions 240 as inputs to generate an output mode expression 240 that has been manipulated via operation of one of the logical functions. For example, a logical function AND can be applied to values of two selection signals.

A MIPE 244 is a string that is comprised of a single phase tag 236 or multiple phase tags 236. In particular, a multi-phase tag 236 MIPE 244 is an expression in which two or more phase tags 236 are joined by a transition-union operator, denoted with the "^" symbol. A MIPE 244 represents a set of waveforms 228 that is a function of the set of waveforms 228 represented by the constituent phase tags 236. Specifically, a MIPE 244 represents the set of all waveforms 228 that have transitions only at times coincident with the times of transitions of waveforms in the sets of waveforms 228 represented by the constituent phase tags 236. Syntactically, a MIPE 244 can be expressed in Backus-Naur form:

```
<mode_independent_phase_expression> ::= <phase_tag> |
<mode_independent_phase_expression> "^" <phase_tag>.
```

For example, the MIPE "A@L ^ B@L" means the set of waveforms that can transition from the leading edge of either clock A or clock B. The MIPE operators 284 allow operations to be performed on MIPES 244.

Phase expressions 248 model the behavior of designs in which at least one circuit component receives a first clock signal and a second clock signal, wherein the first clock signal is asynchronous to the second clock signal. Additionally, phase expressions 248 model the behavior of designs in which at least one circuit component is capable of selecting a first signal or a second signal.

Syntactically, a phase expression 248 can be expressed in Backus-Naur form as follows:

```
<phase_expression>:: = <mode_independent_phase expression>|
<conditional_phase_expression>
<conditional_phase_expression>:: = <mode_expression> "->"
<mode_independent_phase_expression> ":" <phase_expression>.
```

The relationship between a phase expression 248 and the set of waveforms 228 that the phase expression 248 represents is best understood through an example. Consider the example phase expression 248 pe3=m->pe1:pe2, where m is a mode expression 240, pe1 is a MIPE 244, and pe2 is a phase expression 248. The set of waveforms that phase expression pe3 specifies is the set of waveforms w3 such that, for some w1 waveform in pe1 and some w2 waveform in pe2, w3(t)=w1(t) if m is true at time t; otherwise, w3(t)=w2(t). Two phase expressions 248 are equal if the waveform set 228 that each phase expression 248 specifies is the same. In some instances, a phase expression 248 might be optimally expressed in reduced orthogonal form. For example, the phase expression 248 pe=m_1->p_1:m2->p_2: . . . :p_k is in a reduced orthogonal form if four conditions are met: the m_i mode expressions 240 are pairwise orthogonal, meaning that m_i & m_j=0 whenever i does not equal j; none of the m_i mode expressions 240 are constant false Boolean functions, meaning that there does not exist an m_i that equals 0; the mode expression 240 defined by m_k=~1 & ~m_2 & . . . & ~m_{k-1} is not the constant false Boolean function, meaning that m_k does not equal 0; and the p_i MIPEs 244 are different from each other.

The phase expression operators 288 implement mathematical operations (i.e. logical operations) on phase expressions 248. For example, the phase expression operators 288 can be used to find the logical AND of a first phase expression 248 and a second phase expression 248. In general, phase expression operators 288 perform operations on phase expressions 248.

The following flowcharts provide example operation of a phase algebra based design tool that operates with compact multi-waveform representations. These example operations will refer back to the operators and data constructs described herein, and also as described in the tables in the U.S. patent application Ser. No. 14/327,658.

Figure 3:
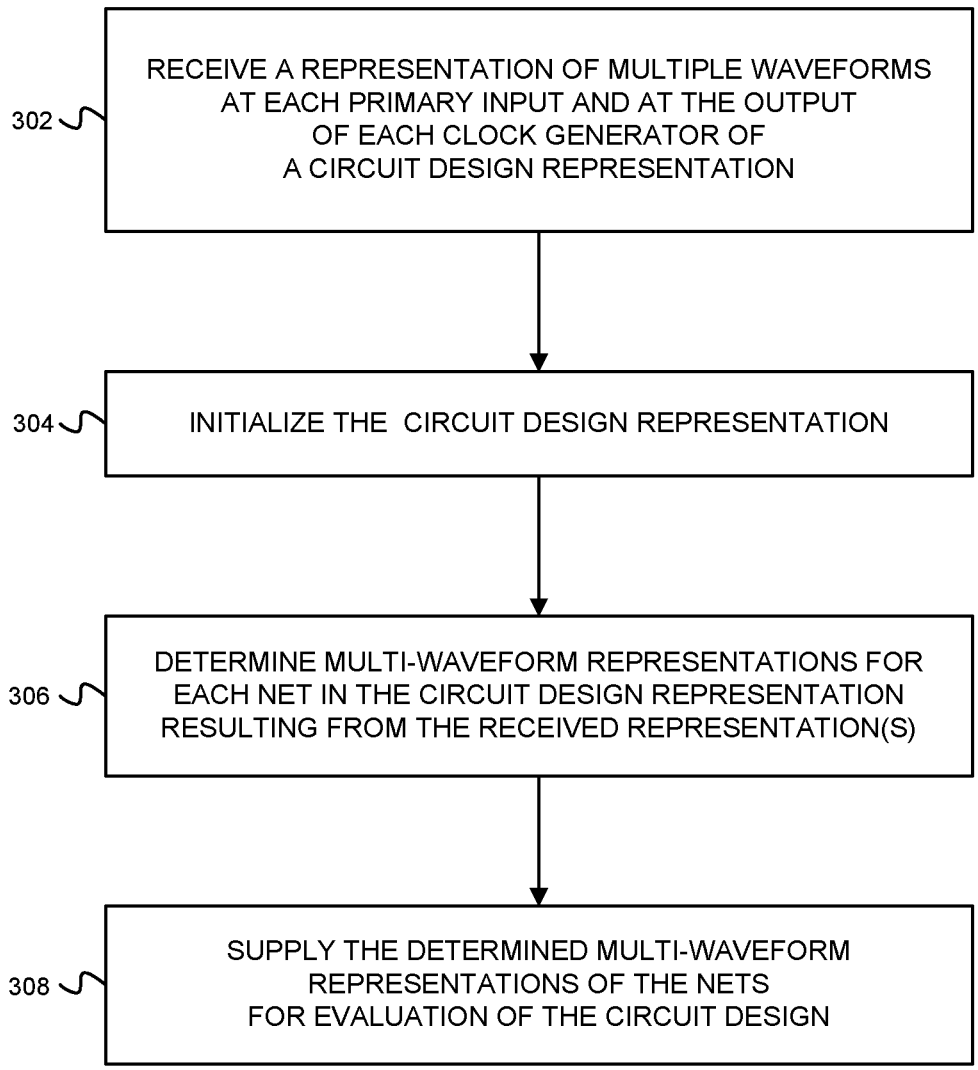
FIG. 3 is a flowchart of example operations for initializing an RTL circuit design representation of phase algebra based evaluation and propagation of compact multi-waveform representations throughout the design representation.

FIG. 3 is a flowchart of example operations for initializing a circuit design representation of phase algebra based evaluation and propagation of compact multi-waveform representations throughout the design representation. At block 302, a representation of multiple waveforms is received at each primary input and at the output of each clock generator of a circuit design representation. For instance, a phase tag or phase expression is associated with a primary input of a circuit design representation. At block 304, the circuit design representation is initialized to prepare the circuit design representation to accept propagated multi-waveform representations. The initialization marks nets for propagation operations. At block 306, the multi-waveform representations are determined for each of the nets in the RTL circuit design resulting from the received multi-waveform representation. For example, operators are applied to determine output phase tags based on the various circuit components modeled in the circuit design representation. At block 308, the determined multi-waveform representations are supplied for evaluation of the RTL circuit design.

As discussed earlier, higher level data constructs (e.g., phase tags) are decomposed into lower level data constructs (e.g., NTFs) in order to apply operations of circuit components modeled in the circuit design representation. These operations often yield a sequence of NTFs or a CWSS that is converted back into a phase type in order for propagation to continue or determine an output to associate with a net for later defect analysis. An output phase type can be determined based on a received input CWSS and a received input phase tag group or meta phase tag group.

Figure 4:
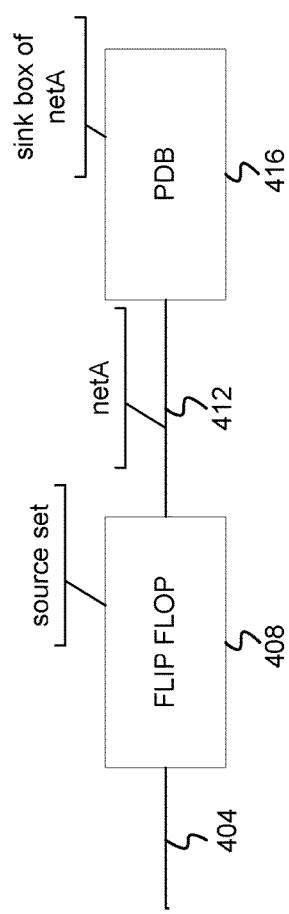
FIG. 4 illustrates terminology associated with the example propagation algorithm and pseudocode to be described.

FIG. 4 illustrates terminology associated with the example propagation algorithm and pseudocode to be described. A flip-flop 408 and path delay block (PDB) 416 are referred to as boxes. The connectors 404, 412 represent nets. The boxes 408, 416 can also be referred to as nodes. The connector 404 is the input net to a flip-flop 408, and the connector 412 ("netA") is both the output net from the flip-flop 408 and the input net to the PDB 416. The propagation algorithm determines an output phase id, which will appear at netA 412. PDB 416 can be referred to as the sink box of netA 412. In one embodiment, a source set and an update set can be established. The source set and update set can be data structures that store information about the status of each box in a circuit design representation. For example, the source set might include boxes that are to be processed by the current iteration of the propagation algorithm. The update set can include boxes that are to be processed by the next iteration of the propagation algorithm. Various embodiments of the propagation algorithm are described below with reference to FIGS. 15-19 and the pseudocode.

Figure 5:
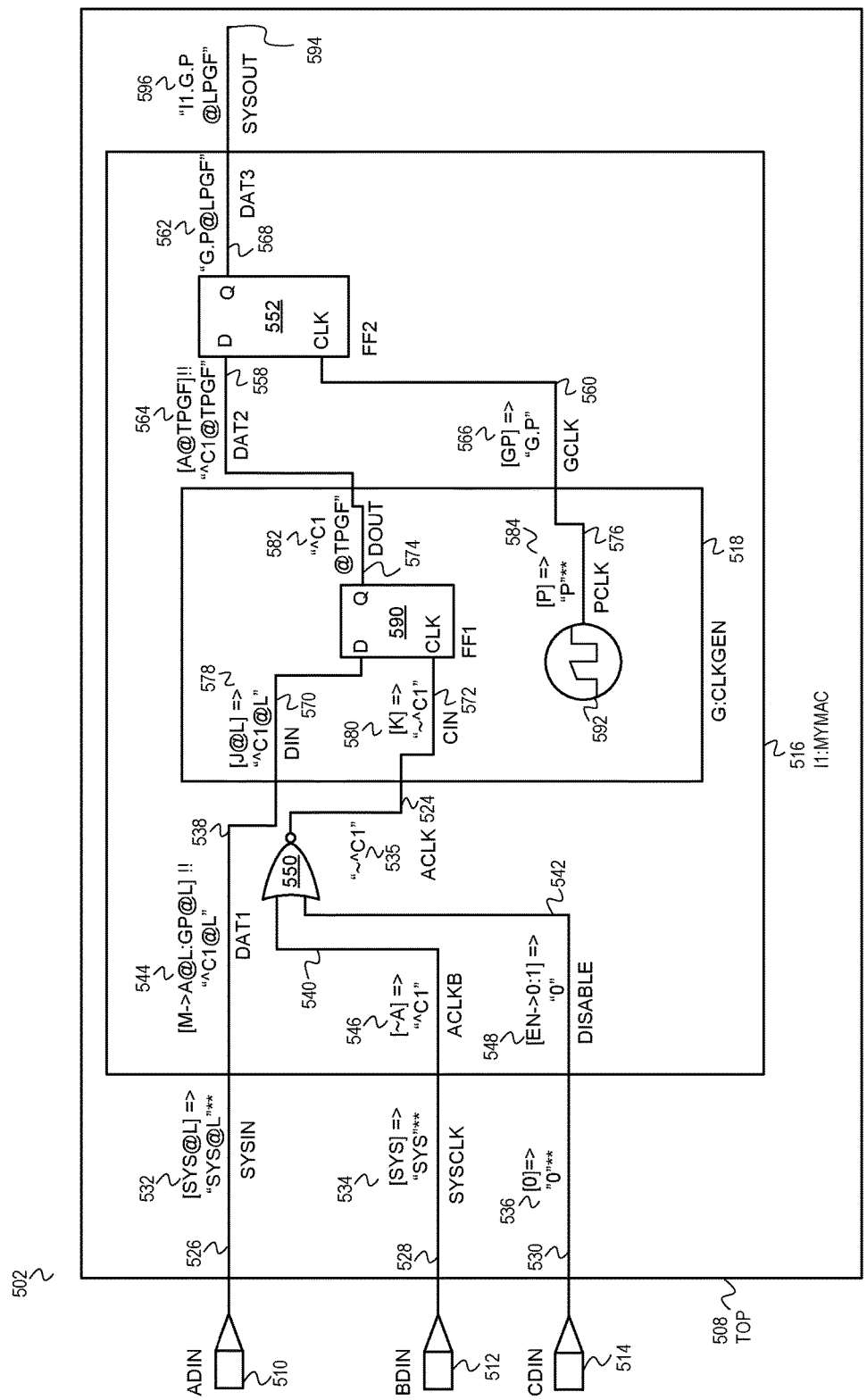
FIG. 5 is a conceptual diagram that depicts example phase algebra based circuit design evaluation with a compact multi-waveform representation that includes multiple hierarchical modules.

FIG. 5 is a conceptual diagram that depicts example phase algebra based circuit design evaluation with a compact multi-waveform representation that includes multiple hierarchical modules. A circuit design representation 502 of FIG. 5 is similar to the circuit design representation 102 of FIG. 1, with an addition of phase expression characteristics of phase expressions. The phase expression characteristics (shown using alphanumeric characters including [ ], !!, , =>) at each hierarchy level can indicate whether a certain phase expression is specified [ ], whether it is externally or internally sourced, whether it is a seeding phase expression , whether a specification mapping can be determined for phase expressions of corresponding signals => or !!, among others. It is noted that in some embodiments, the tool may use only one or more of these phase expression characteristics when propagating phase expressions. The phase expression characteristics are explained in detail below.

In FIG. 5, specified phase expressions (i.e., phase expressions that are specified at the module hierarchy level) are enclosed with brackets [ ]. Thus, the phase expressions [SYS@L] 532 and [~SYS] 534 are specified at the hierarchy level of TOP 508. The phase expression "0" 536 can be specified at the hierarchy level of TOP 508. In some embodiments, the specification of phase expression "0" is indicative of a signal being tied to ground. The phase expressions [M->A@L:GP@L] 544, [~A] 546, and [EN->0:1] 548 are specified at the hierarchy level of I1:MYMAC 516. The phase expressions [J@L] 578, [K] 580, and [P] 584 are specified at the hierarchy level of G:CLKGEN 518.

The circuit design representation 502 includes primary inputs 510, 512, and 514, that are analogous to the primary inputs 110, 112, and 114 of the circuit design representation 102, respectively.

In FIG. 5, specified phase expressions can be seeding or non-seeding. A seeding specified phase expression is a specified phase expression that "seeds" a usage phase expression of the corresponding signal. In FIG. 5, a seeding specified phase expression is indicated by **. A seeding specified phase expression is mapped to a seeding usage phase expression by replacing its references to specified virtual clocks and modes to usage virtual clocks and modes or constants to which they are mapped. The seeding usage phase expression (also referred to as a seeding phase expression) is then used to seed, i.e., initialize, a phase expression propagation for a given usage. Once seeded, usage phase expressions are propagated through a design in the same manner as described in the U.S. patent application Ser. No. 14/651,539.

Thus in FIG. 5, the specified seeding phase expression [SYS@L] 532 is mapped to a usage seeding phase expression of "SYS@L" 532. Similarly, the specified seeding phase expression [SYS] is mapped to a usage seeding phase expression of "SYS" 534. The specified seeding phase expression [SYS] is a sourcing phase expression, meaning that its signal exhibits a waveform of a virtual clock or mode. The usage seeding phase expression of "SYS" 534 seeds (or initializes) the propagation of usage phase expression 534 to the usage phase expression "^C1" 546 of signal ACLKB 540 of the corresponding signal pair of signals 528 and 540. The usage phase expression "^C1" 546 is determined by a hierarchical mapping as mentioned earlier. In FIG. 5, a signal 530 of the corresponding signal pair of signals 530 and 542 is specified as a constant of "0". Therefore, regardless of what phase expression is specified at the I1:MYMAC 516 level, the tool will propagate the constant of "0" for the phase expression 548.

The usage seeding phase expression of "SYS@L" 532 is mapped, using a hierarchical mapping, to a phase expression of "^C1@L" at the other signal 538 of the corresponding signal pair of signals 526 and 538. However, the phase expression of [M→A@L:GP@L] 544 that is specified for the signal 538 at the I1:MYMAC 516 cannot be mapped, using a specification mapping, to the "^C1@L" phase expression (that should be used when propagating the "SYS@L" 532 phase expression). In other words, there is no mapping for virtual clocks A or GP, or for mode M, that would enable the phase expression of [M->A@L:GP@L] 544 that is specified for the signal 538 at the I1:MYMAC 516 to be mapped to the "^C1@L" usage phase expression. In FIG. 5, an unmapped virtual clock, mode, or phase expression is indicated by the !! phase expression characteristic, which indicates that the specified phase expression 544 cannot be mapped to the usage phase expression 544 of signal 538. This is shown by [M→A@L:GP@L]!!"^C1@L".

Figure 6:
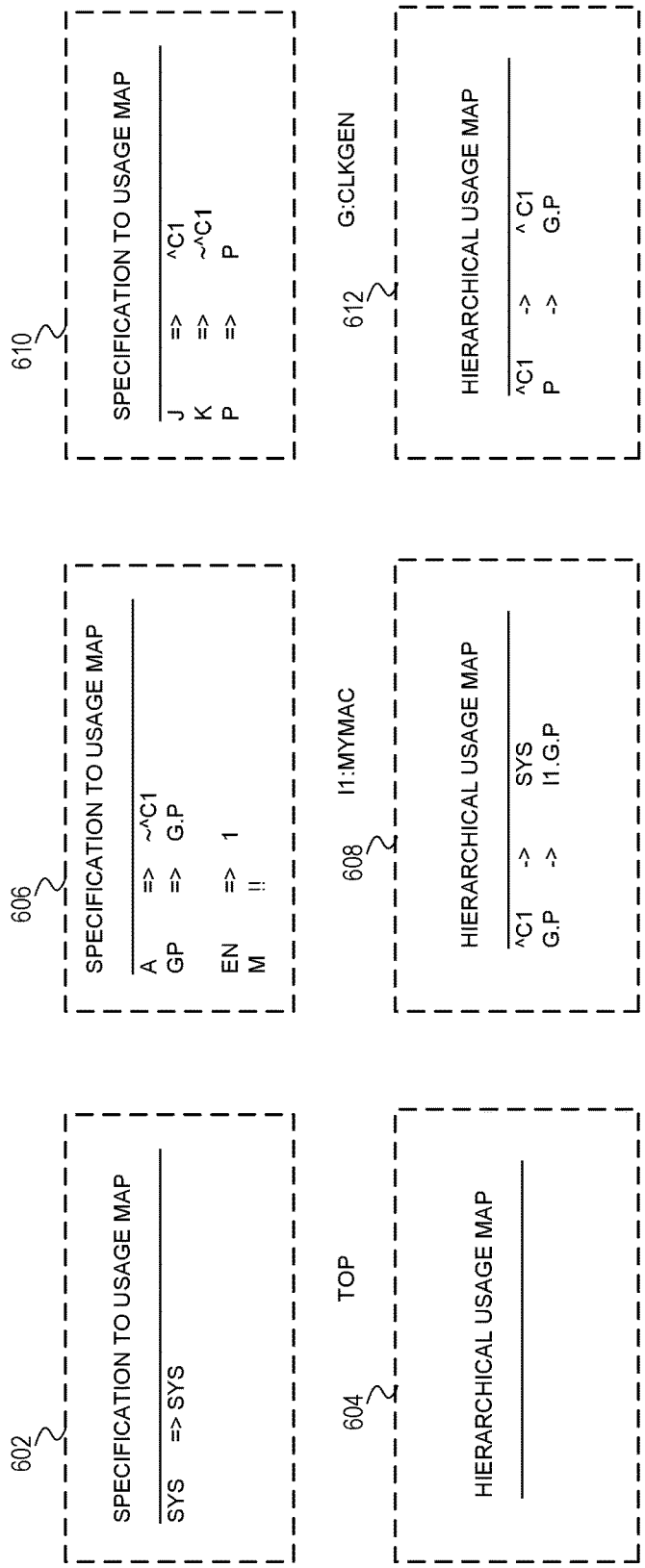
FIG. 6 is a conceptual diagram that depicts specification to usage mappings and hierarchical usage mappings of hierarchical modules of FIG. 5.

With reference to FIG. 6, a specification to usage map 602 for the hierarchy level of TOP 508 includes a single specification mapping of a specified virtual clock of SYS to a usage virtual clock of SYS for the hierarchy level of TOP 508. Thus, as phase expression 532 shows, the specified phase expression of [SYS@L] is mapped, using the specification to usage mapping 602, to the usage phase expression of "SYS@L". The specification to usage map 602 is for mapping specified phase expressions that are specified at the TOP 508 hierarchy level to usage phase expressions at the same TOP 508 hierarchy level. The hierarchical usage map 604 for the module TOP 508 is empty (as there is no higher hierarchical level module that includes the module TOP 508).

With reference to FIG. 6, a specification to usage map 606 of the hierarchy level of I1:MYMAC 516 includes four specification mappings. The specified virtual clock A maps to the inverse of usage virtual clock ^C1, indicated by the notation ~^C1. The clock A is externally-sourced, meaning that an oscillator it represents is located outside of the current module (i.e., the module I1:MYMAC 516). The specified virtual clock GP maps to usage virtual clock G.P. The clock GP is internally-sourced, meaning that an oscillator it represents is located inside the current module (i.e., the module I1:MYMAC 516). The mode EN maps to constant 1. The mode EN is externally-sourced, meaning that it represents a Boolean function of the value of a signal located outside the current module (i.e., the module I1:MYMAC 516). For example mode EN can represent the inverse of the value of the signal 530. The mode M cannot map to any mode or constant, and thus is unmapped, as indicated by a phase expression characteristic of !!. The specification to usage map 606 is for mapping specified phase expressions that are specified at the I1:MYMAC 516 hierarchy level to usage phase expressions at the same I1:MYMAC 516 hierarchy level.

The hierarchical usage map 608 between the module TOP 508 and the module instance I1:MYMAC 516 includes two hierarchical mappings. The first hierarchical mapping maps a usage virtual clock ^C1 in module I1:MYMAC to a usage virtual clock SYS in module TOP. The second hierarchical mapping maps usage virtual clock G.P in module I1:MYMAC to usage virtual clock I1.G.P in module TOP. The hierarchical usage map 608 is for mapping usage phase expressions that are propagated from the TOP 508 hierarchy level to usage phase expressions at the I1:MYMAC 516 hierarchy level, and also for mapping usage phase expressions that are propagated from the I1:MYMAC 516 hierarchy level to usage phase expressions at the TOP 508 hierarchy level. The generation and use of the hierarchical usage map is described below with reference to FIGS. 15 and 17-19. The generation of the hierarchical usage map is also described in more detail with reference to the U.S. patent application Ser. No. 14/651,539.

With continued reference to FIG. 6, a specification to usage map 610 of the hierarchy level of G:CLKGEN 518 includes three specification mappings. The specified virtual clock J maps to usage virtual clock ^C1. The clock J is externally-sourced. The specified virtual clock K maps to the inverse of usage virtual clock ^C1, indicated by the notation ~^C1. The clock P is externally-sourced. The specified virtual clock P maps to usage virtual clock P. The specification to usage map 610 is for mapping specified phase expressions that are specified at the G:CLKGEN 518 hierarchy level to usage phase expressions at the same G:CLKGEN 518 hierarchy level.

The hierarchical usage map 612 between the module I1:MYMAC 516 and the module G:CLKGEN 518 includes two hierarchical mappings. The first hierarchical usage mapping maps a usage virtual clock ^C1 in module G:CLKGEN to a usage virtual clock ^C1 in module I1:MYMAC. The second hierarchical usage mapping maps usage virtual clock P in module G:CLKGEN to usage virtual clock G.P in module I1:MYMAC. The hierarchical usage map 612 is for mapping usage phase expressions that are propagated from the I1:MYMAC 516 hierarchy level to usage phase expressions at the G:CLKGEN 518 hierarchy level, and also for usage phase expressions that are propagated from the G:CLKGEN 518 hierarchy level to usage phase expressions at the I1:MYMAC 516 hierarchy level.

The "^C1@L" usage phase expression 544 is used by the tool to propagate a phase expression for the signal 538, even though the specified phase expression [M→A@L:GP@L] is an unmapped phase expression. The "^C1@L" phase expression 544 of signal 538 is used by the tool to propagate to the module G:CLKGEN 518 as a phase expression 578 of signal DIN 570, where signals 538 and 570 are a corresponding signal pair. Usage phase expressions "^C1" 546 and "0" 548 are used by the tool for propagation through a NOR gate 550. A usage phase expression "~^C1" 535 of signal ACLK 524 is used by the tool to propagate to the module G:CLKGEN 518 as a phase expression 580 of signal CIN 572 of its corresponding signal pair.

The "^C1@L" phase expression 578 of signal 570 is mapped by the tool from the specified phase expression [J@L] 578 via the specification to usage map 610. The "~^C1" phase expression 580 of signal 572 is mapped by the tool from the specified phase expression [K] 580 via the specification to usage map 610. The usage phase expressions 578 and 580 are used by the tool for propagation through the flip-flop 590 to generate a resultant phase expression "^C1@TPGF" 582 on signal DOUT 574. It is noted that the usage phase expressions 578 and 580 can also be mapped down by the tool from the usage phase expressions in I1:MYMAC 516. Thus, the tool can be used at either the CLKGEN hierarchy level or at the higher level.

The tool may attempt to determine a specification to usage mapping for specified phase expression [A@TPGF] 564 on signal DAT2 558 to map it to a usage phase expression on the same signal DAT2 558. The usage phase expression "^C1@TPGF" is the phase expression to be propagated, as it is propagated by the usage phase expression 582 of the corresponding signal DOUT 574. However, there may not be a specification mapping possible between the specified phase expression and the usage phase expression (propagated by the flip-flop 590). The tool may instead use the "^C1@TPGF" phase expression 564 for propagation (even though it is not mapped from its respective specified phase expression). In some embodiments, the tool can report an inconsistency between the specified phase expression and the propagated usage phase expression. The tool can propagate usage phase expression "P" 584 of signal 576 that is mapped (via a hierarchical mapping 612) to usage phase expression "G.P" 566 of signal GCLK 560. The tool maps specified phase expression [P] 584 to usage phase expression "P" using the specification mapping 610. The tool maps specified phase expression [GP] 566 to usage phase expression "G.P" using the specification mapping 606. In this instance the specified phase expression [GP] is consistent with the propagated usage phase expression "G.P".

The tool can propagate the usage phase expression "^C1@TPGF" 564 and the usage phase expression "G.P" 566 (of signal GCLK 560) through the flip-flop 552 to generate a resultant usage phase expression "G.P@LPGF" 562 of signal DAT3 568. The phase expression 562 can be mapped, using the hierarchical usage map 608 to a usage phase expression "I1.G.P@LPGF" 596 of signal SYSOUT. It is noted that the hierarchical usage map 608 maps the phase expression 562 to the phase expression 596 across a module boundary between the module instance I1:MYMAC 516 and the module TOP 508. The tool can generate a hierarchical mapping for each of the module instances 516 and 518. Thus, the tool generates hierarchical mappings 608 and 612 for the module instances 516 and 518, respectively. Given a virtual clock and mode map at an instance box, the tool can transform a phase expression in the instantiating module into a phase expression in the defining module, or vice versa.

In one embodiment, the tool will perform the phase algebra based circuit design evaluation with a compact multi-waveform representation that includes multiple hierarchical modules including specification mapping and hierarchical mapping if one or more of the following conditions are satisfied. With reference to the below conditions, a signal associated with a sourcing phase specification is referred to as a local clock source or local mode source, depending on whether the waveform is that of a virtual clock or mode. Such a signal could be probed by a verification environment to sample the clock or mode. A virtual clock or mode that is referenced by a sourcing phase specification is said to be observable. If a virtual clock or mode is not referenced by any sourcing phase expression, it referred to as being unobservable.

1. There can be one sourcing phase specification per specified virtual clock or mode. For example, the virtual clock A in the module I1:MYMAC 516 is referenced by two phase expressions (also referred to as "phase specifications") (on signals DAT1 544 and ACLKB 540), but only one (signal ACLKB 540) is a sourcing phase specification. Multiple input ports of a module may (redundantly) receive the waveform of a virtual clock or mode, and have identical phase expressions, but only one input port can be designated as the local source.

2. A sourcing phase specification that references an externally sourced virtual clock or mode is associated with an input signal of the module (i.e., a signal attached to an input port). For example, signals ACLKB 540 and DISABLE 542 are input signals of the module I1:MYMAC 516; and signal CIN 572 is an input signal of the module G:CLKGEN 518.

3. An unobservable externally sourced virtual clock or mode is referenced by at least one phase specification assigned to a module input signal. For example, mode M in the module I1:MYMAC 516 is unobservable but referenced by the phase specification on the input signal DAT1 538. The virtual clock J in the module G:CLKGEN 518 is unobservable, but is referenced by the phase specification on the input signal DIN 570.

4. A sourcing phase specification that references an internally sourced virtual clock or mode is associated with a non-input signal (internal signal or output). The sourcing phase specification may be associated with a signal attached to the output pin of an instance box, clock generator (if a clock) or storage element (if a mode). Examples are the sourcing phase expressions for the signal GCLK 560 in the module I1:MYMAC 516 and for the signal PCLK 576 in the module G:CLKGEN 518.

5. An unobservable internally sourced virtual clock or mode is referenced by at least one phase specification assigned to a non-input signal attached to the output of an instance box. Furthermore, if the virtual clock or mode is referenced by multiple phase specifications assigned to outputs of multiple instance boxes of which at least one is a black box, then an instance box is designated as the sourcing instance box for the virtual clock or mode. If there is only one such instance box, then it is implicitly designated as the sourcing instance box. A black box is an instance box which is not analyzed by the tool. In other words, phase expressions are not mapped down to, propagated through, or mapped up from the instance box that is a black box.

Figure 7:
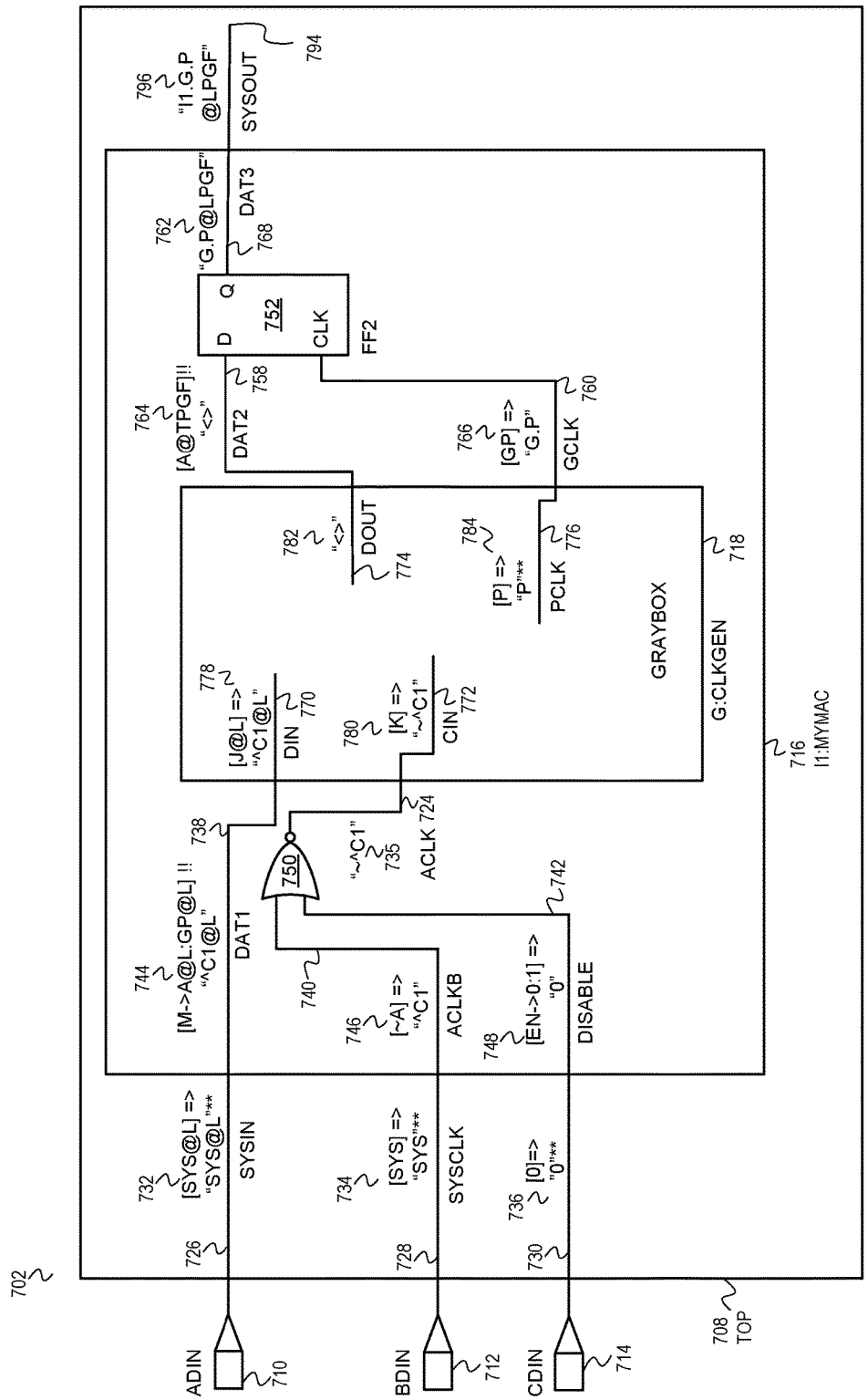
FIG. 7 is a conceptual diagram that depicts example phase algebra based circuit design evaluation with a compact multi-waveform representation that includes multiple hierarchical modules including a gray box module.
Figure 8:
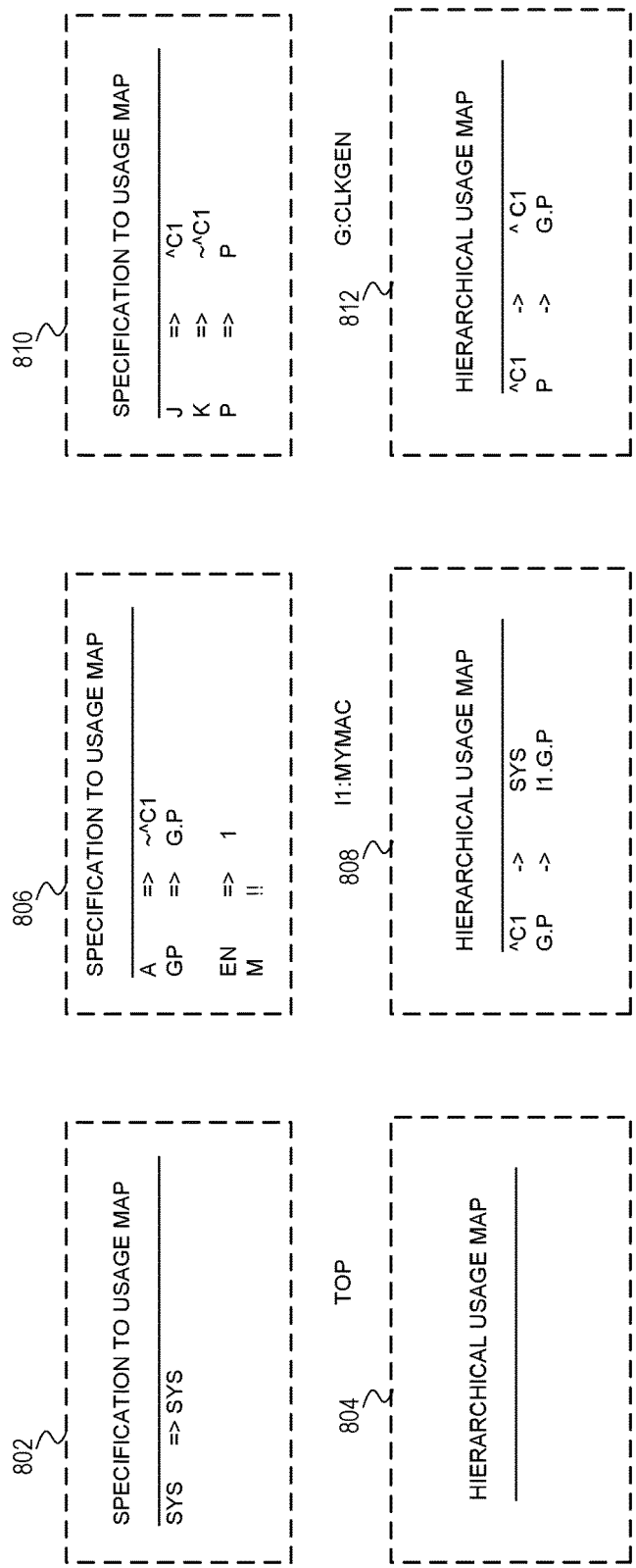
FIG. 8 is a conceptual diagram that depicts specification to usage mappings and hierarchical usage mappings of hierarchical modules of FIG. 7.

FIG. 7 is a conceptual diagram that depicts example phase algebra based circuit design evaluation with a compact multi-waveform representation that includes multiple hierarchical modules including a gray box module. A gray box module is a module in which only signals attached to input or output ports are analyzed. A circuit design representation 702 of FIG. 7 is similar to the circuit design representation 502 of FIG. 5, with an addition of a gray box module 718. Input signals 770 and 772 of the gray box module 718 can be checked for receiving correct phase expressions from its instantiating module I1:MYMAC 716. Output signals 774 and 776 of the gray box module can be assigned phase expressions that are then propagated to the instantiating module I1:MYMAC 716. This allows the interface to the gray box module 718 to be checked while ignoring any logic that is internal to the gray box module 718.

With reference to FIG. 7, specified phase expressions [J@L] 778 and [K] 780 assigned (e.g., designated by the designer of gray box module 718) to the inputs of module G:CLKGEN, and specified phase expression [P] 784 assigned to an output of module G:CLKGEN specify the interface of the gray box module 718. These specifications can be used by the tool to verify that the proper phases are driven to the inputs of the instance of CLKGEN (i.e., the gray box module 718), and also to propagate the proper phases from the outputs of the gray box module 718.

As noted above, the circuit design representation 702 is similar to the circuit design representation 502 of FIG. 1. Therefore, phase expressions (or constants) 732, 734, and 736 of signals 726, 728, and 730 are similar to phase expressions (or constants) 532, 534, and 536 of signals 526, 528, and 530, respectively. Similarly, phase expressions 744, 746, and 748 of signals 738, 740, and 742 are similar to phase expressions 544, 546, and 548 of signals 538, 540, and 542, respectively. Phase expression 735 of signal 724 is similar to phase expression 535 of signal 524. Phase expression 784 of signal 776 is similar to phase expression 584 of signal 576. A specification to usage map 802 is similar to the specification to usage map 602. A hierarchical usage map 804 is similar to the hierarchical usage map 604. A specification to usage map 810 is similar to the specification to usage map 610. A hierarchical usage map 812 is similar to the hierarchical usage map 612. Although module 718 is a gray box, the specification to usage map 806 is similar to the specification to usage map 606. A hierarchical usage map 808 is similar to the hierarchical usage map 608.

As module 718 is a gray box, the signal DAT2 in the usage MYMAC-U1 (i.e., the usage of the module I1:MYMAC 716) has a null ("<>") usage phase expression 764. The specified phase expression of [A@TPGF] 764 is initially mapped to null because no phase expression (i.e., a null phase expression "<>" 782) was specified for output signal DOUT 774 in module G:CLKGEN 718. Since module 718 is a gray box, no phase expression was propagated to the signal DOUT 774. If instead the specified phase expression "K@LPGF" had been assigned to signal DOUT, then the tool can map the specified phase expression "K@LPGF" to a usage phase expression "^C1@TPGF" (i.e., similar to the phase expression 582 of signal DOUT 574 of FIG. 5), which is then propagated up to the usage MYMAC-U1 where it would be mapped to phase expression "^C1@TPGF" of signal DAT2 758.

Figure 9:
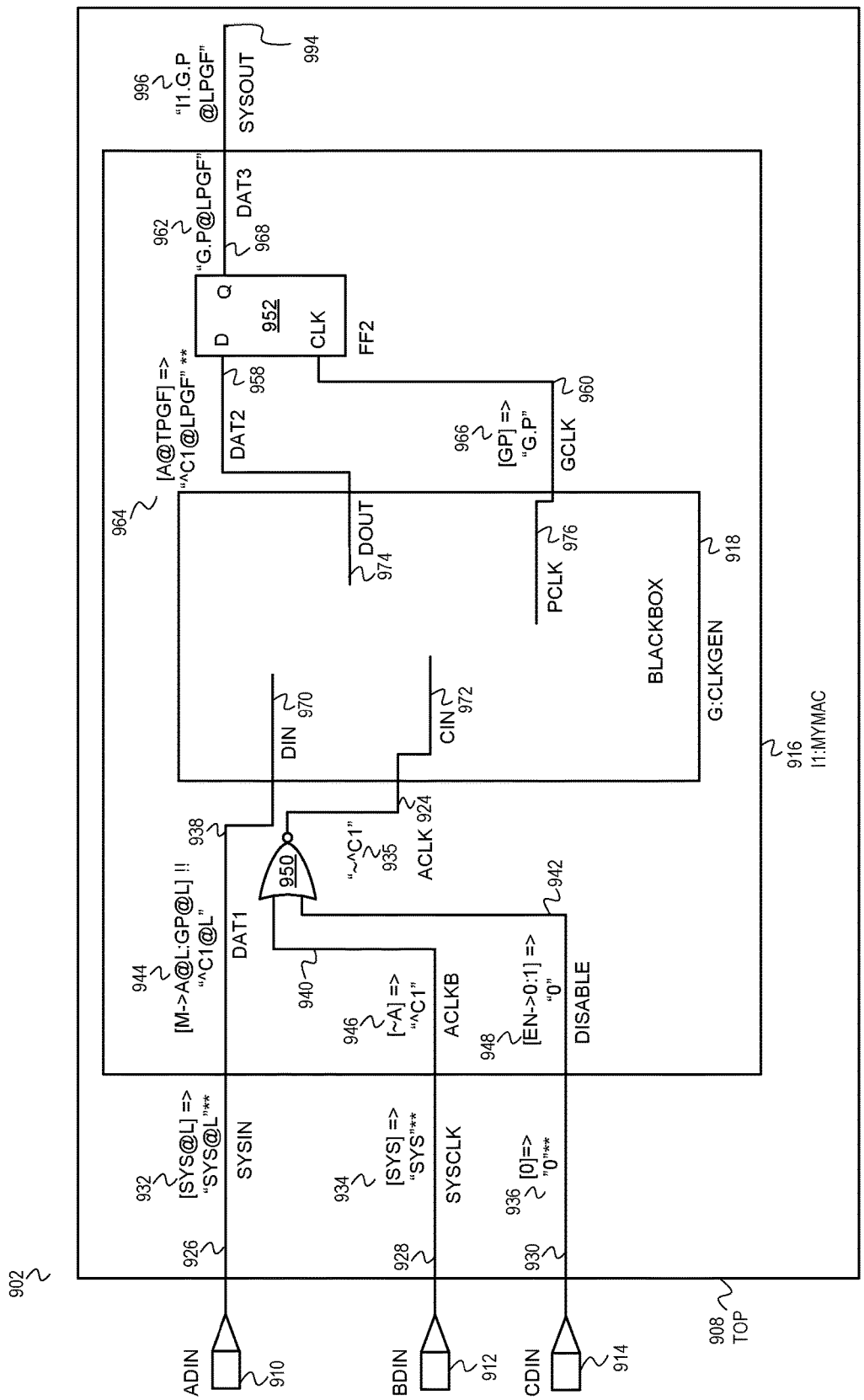
FIG. 9 is a conceptual diagram that depicts example phase algebra based circuit design evaluation with a compact multi-waveform representation that includes multiple hierarchical modules including a black box module.
Figure 10:
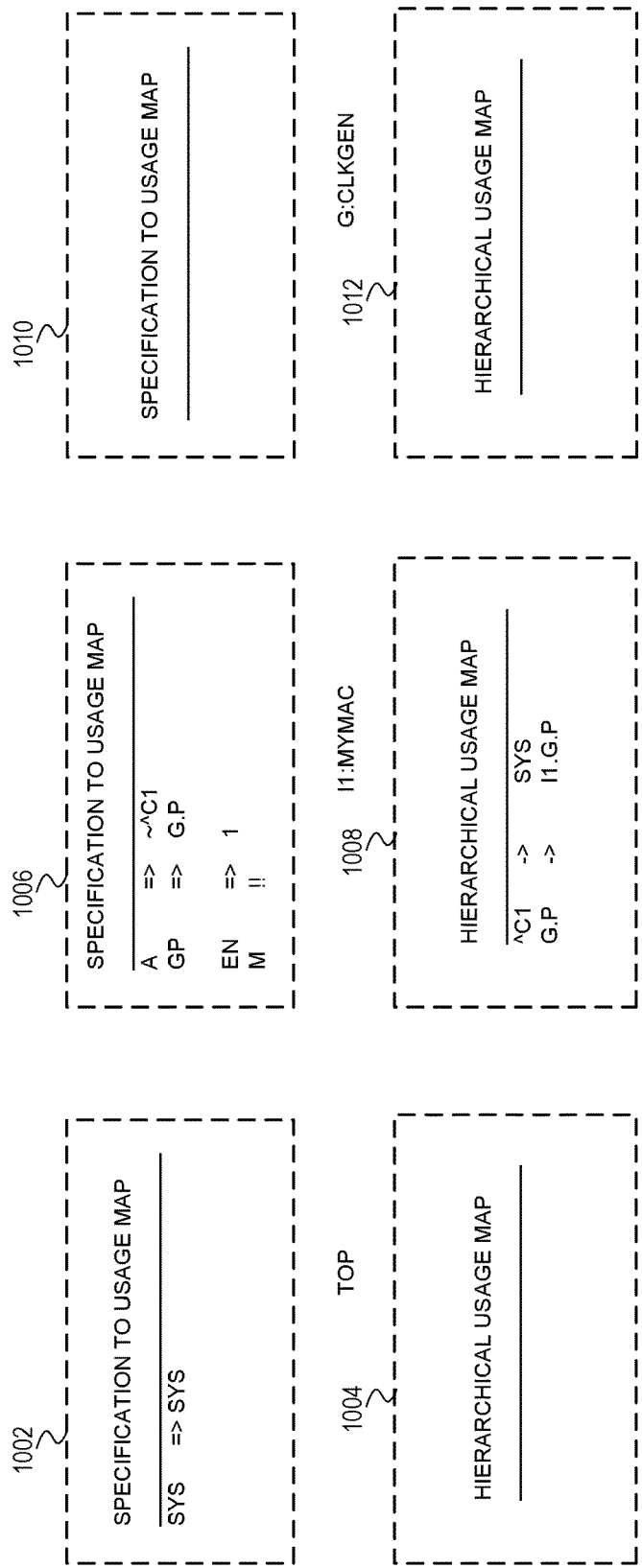
FIG. 10 is a conceptual diagram that depicts specification to usage mappings and hierarchical usage mappings of hierarchical modules of FIG. 9.

FIG. 9 is a conceptual diagram that depicts example phase algebra based circuit design evaluation with a compact multi-waveform representation that includes multiple hierarchical modules including a black box module. A circuit design representation 902 of FIG. 9 is similar to the circuit design representation 502 of FIG. 5, with an addition of an instance box 918 that is a black box 918. A black box is typically different from a gray box in that no phase expressions are specified internal to the black box. In other words, the black box 918 is ignored and no phase expressions are propagated through the black box. Instead, specified phase expressions may be assigned to signals connected to inputs 970 and 972, and outputs 974 and 976 of the black box 918. For example, a specified phase expression "A@TPGF" could be assigned to signal DAT2 958 to specify its behavior relative to other signals in module I1:MYMAC 916. These assigned phase expressions would also be needed when using the tool to analyze higher level modules (e.g., module TOP 908).

As noted above, the circuit design representation 902 is similar to the circuit design representation 502 of FIG. 1. Therefore, phase expressions (or constants) 932, 934, and 936 of signals 926, 928, and 930 are similar to phase expressions (or constants) 532, 534, and 536 of signals 526, 528, and 530, respectively. Similarly, phase expressions 944, 946, and 948 of signals 938, 940, and 942 are similar to phase expressions 544, 546, and 548 of signals 538, 540, and 542, respectively. Phase expression 935 of signal 924 is similar to phase expression 535 of signal 524. A specification to usage map 1002 is similar to the specification to usage map 602. A hierarchical usage map 1004 is similar to the hierarchical usage map 604. The specification to usage map 1006 is similar to the specification to usage map 606. A hierarchical usage map 1008 is similar to the hierarchical usage map 608. However, since module 1018 is a black-box, a specification to usage map 1010 is different from the specification to usage map 610, i.e., it is null. A hierarchical usage map 1012 is different from the hierarchical usage map 612, i.e., it is null. As the instance box 918 is a black-box, the signals DIN 970, CIN 972, DOUT 974, and PCLK 976 all have null ("<>") phase expressions.

Because the instance box 918 is a black box, and signal 958 is attached to the output of an instance of the black box 918, the specified phase expression [A@TPGF] 964 is a seeding phase expression. For example, a designer can assign the specified phase expression [A@TPGF] to the signal DAT2 958 in a usage MYMAC-U1 (of the module I1:MYMAC 916). The tool can use the specification to usage map 1006 to map assigned specified phase expression [A@TPGF] to usage phase expression "^C1@LPGF" 964, which will seed propagation through the flip-flop 952. This differs from the usage phase expression on this output from the previous example (i.e., phase expression "<>" 764 of FIG. 7).

Figure 11:
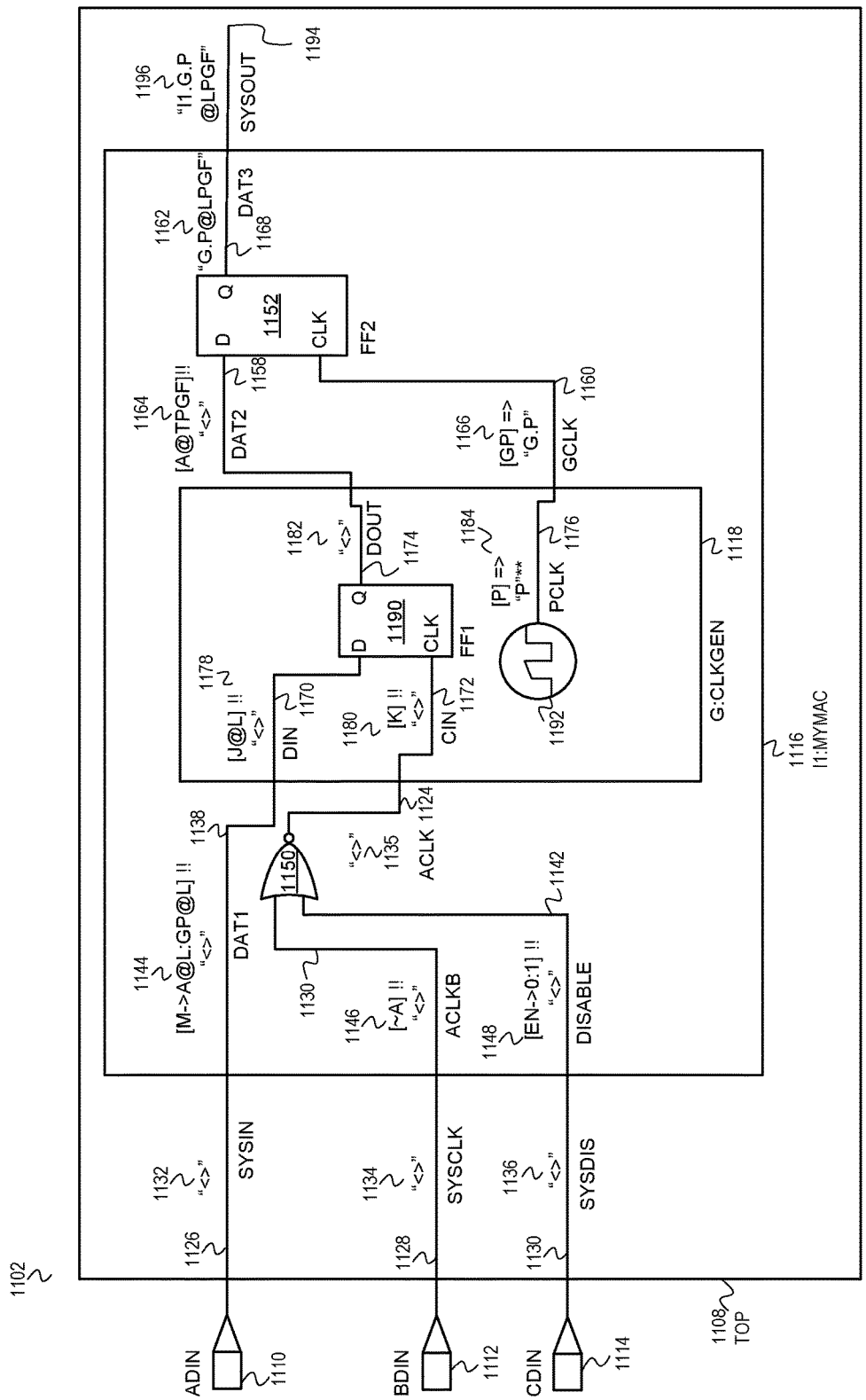
FIG. 11 is a conceptual diagram that depicts extracting modes and clocks in an example phase algebra based circuit design evaluation with a compact multi-waveform representation.

FIG. 11 is a conceptual diagram that depicts extracting modes and clocks in an example phase algebra based circuit design evaluation with a compact multi-waveform representation. In FIG. 11, the module I1: MYMACK 1116 containing module instance G:CLKGEN 1118 is being instantiated in a higher level module TOP 1108 only for the purpose of verification of the modules G:CLKGEN 1118 and I1:MYMAC 1116. The module TOP 1108 is a higher lever module that may be referred to as a "test bench." A circuit design representation 1102 of FIG. 11 is similar to the circuit design representation 502 of FIG. 5, except that the phase expressions for the module TOP 1108 are not specified, i.e., are null "<>". In FIG. 11, the tool can infer the phase signals for the module TOP 1108 from the specifications at the lower level module instances I1:MY-MACK 1116 and G:CLKGEN 1118.

In the circuit design representation 1102, the phase expressions for the module TOP 1108 are not specified, i.e., are null "<>". Therefore, phase expressions 1132, 1134, 1136 of signals 1126, 1128, and 1130 are null "<>". Although specified phase expressions 1144, 1146, and 1148 are specified, there are no specified mappings (as shown by specification to usage map 1206) that can map the specified phase expressions to null "<>". Similarly, although specified phase expressions 1178 and 1180 are specified, there are no specified mappings (as shown by specification to usage map 1210) that can map the specified phase expressions to null "<>". Since there are no usage phase expressions being propagated through flip-flop 1190, the output of the flip-flop 1190 is also null (phase expression 1182 of signal 1174). However, clock generator 1192 can propagate phase expression "P" that is mapped to the specified phase expression [P] 1184 on signal PCLK 1176. Since phase expressions 1132, 1134, 1135, 1136 of signals 1126, 1128, 1124, and 1130 are null "<>", the maps 1202, 1206, 1208, 1210, and 1212 are different from that of FIG. 6.

In FIG. 11, the phase expressions 1132, 1134, 1136 are not provided for the module TOP 1108. The DISABLE signal 1142 in the I1:MYMAC 1116 module is driven by a top level input. The tool assigns the null phase expression ("<>") to the top level inputs 1132, 1134, and 1136, which are then propagated forward. The propagation of the null phase expression can cause the specifications of the MYMAC input port signals to be ignored, and virtual clock A and mode EN (i.e., of the specified phase expressions 1144, 1146, and 1148) to remain unmapped.

The tool can perform clock and mode extraction to infer usage virtual clocks or modes based on unmapped specified externally sourced virtual clocks or modes at lower levels. The tool can propagate backwards (i.e., up the hierarchy) specified virtual clocks and/or modes. The tool can perform the backward propagation after normal phase propagation is completed for any remaining unmapped specified virtual clocks or modes. With reference to FIG. 11, the virtual clocks and modes that can be extracted onto nets have the null ("<>") or unknown ("–") phase expressions.

Figure 13:
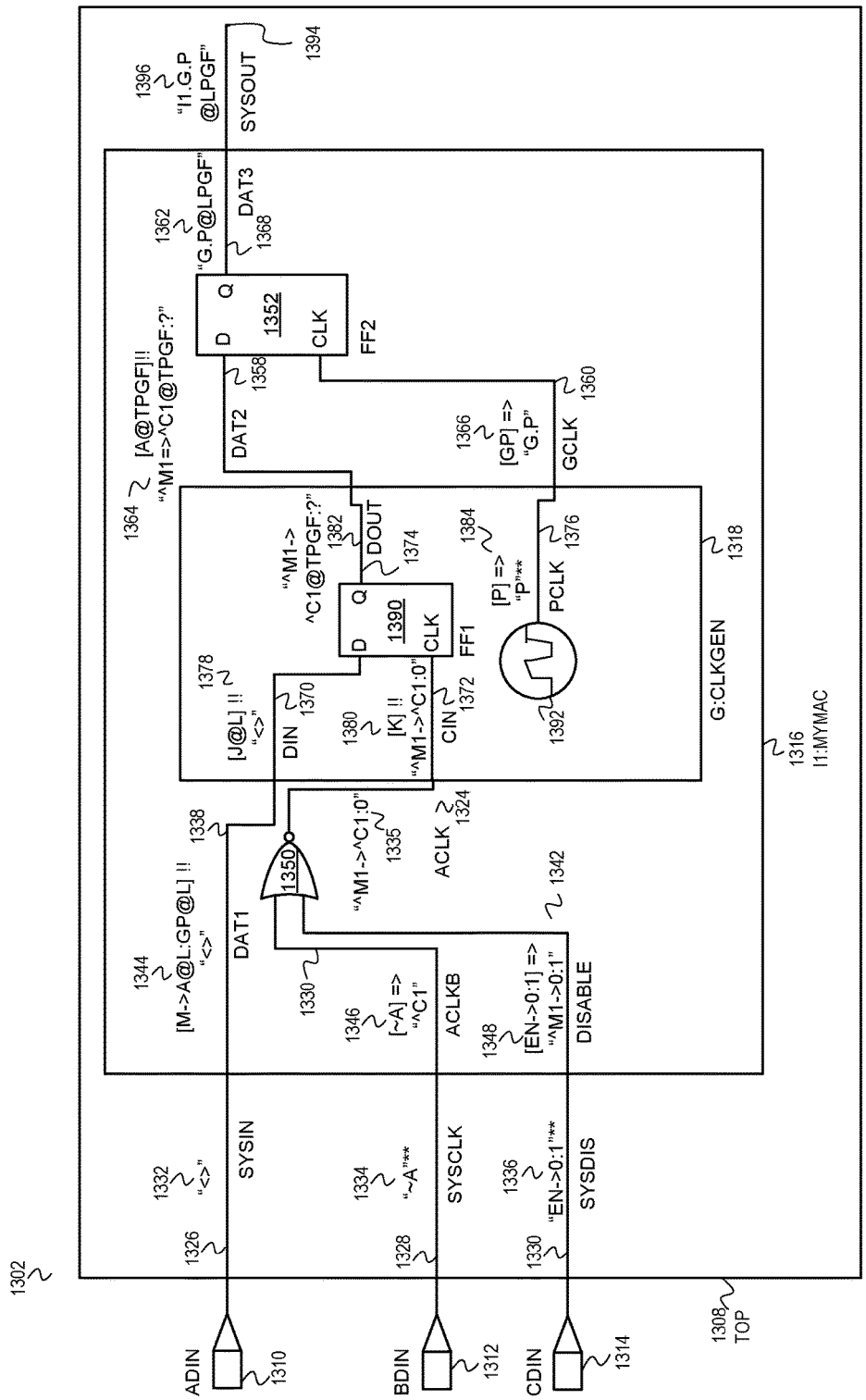
FIG. 13 is a conceptual diagram that also depicts extracting modes and clocks in an example phase algebra based circuit design evaluation with a compact multi-waveform representation.
Figure 14:
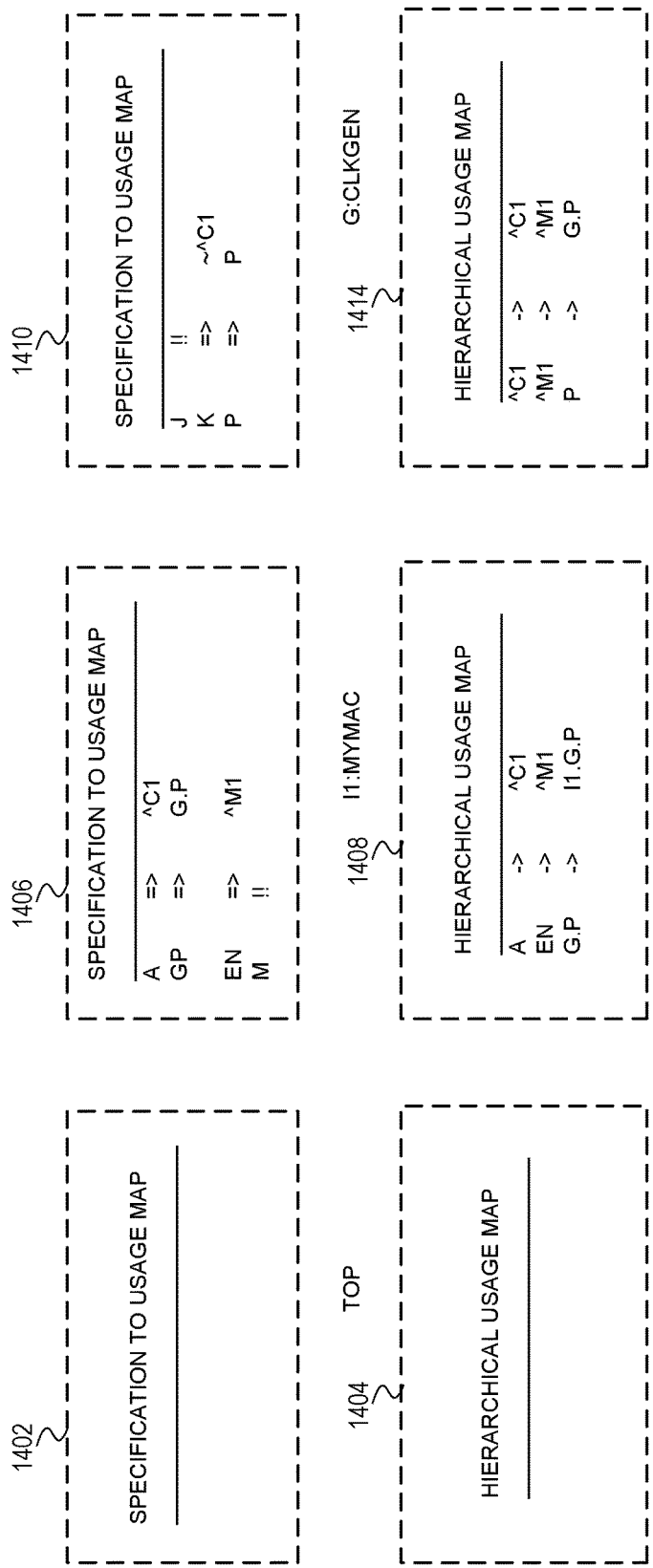
FIG. 14 is a conceptual diagram that depicts specification to usage mappings and hierarchical usage mappings of hierarchical modules of FIG. 13.

The tool can use the unmapped specified virtual clock and/or mode to create an extracted usage virtual clock or mode in the target module. The tool can then assign a target net with a seeding usage phase expression. After the seeding usage phase expression is assigned, the tool can again propagate phase expressions on the target module. The tool can recursively repeat the process of extracting to a given module, and reiterating phase propagation through that module, through the design hierarchy. With reference to FIG. 11, specified virtual clock A and mode EN of module I:MYMAC 1116 are extracted to create usage virtual clock A and mode EN in the usage TOP-U1 (of the module Top 1108), on target nets for signals SYSCLK 1128 and DISABLE 1130, respectively. FIGS. 13 and 14 show the extracted virtual clocks and associated mappings after the process of extracting to respective modules, and reiterating phase propagation through the module, through the design hierarchy as shown in FIG. 11.

In one embodiment, the tool will check for the following conditions prior to extracting the clocks and/or modes. With reference to FIG. 11, a target net of the target module TOP 1108 includes nets or signals 1132, 1134, and 1136. With reference to FIG. 11, a target net of the target module I1:MYMAC 1116 includes nets for signals 1138 and 1124. Signal 1168 is not part of the target net as it includes a resultant phase expression that is a result of being propagated through the flip-flop 1152. The tool performs the extraction process with respect to a target net in a target usage of a module, when most, or all, of the following conditions are met.

1. Normal phase propagation, as described above with reference to FIGS. 5 and 6, has completed.
2. The target net feeds a lower level module input signal that is a local clock or mode source for an unmapped specified virtual clock or mode (i.e., for a specified virtual clock or mode that does not have a specification to usage mapping).
3. Between the target net and the local clock/mode source there are only buffers, inverters, or other levels of hierarchy (such as inputs to a module) whose input signals do not have phase specifications.
4. The target net is either a top level input, or an output of a primitive component other than a buffer or an inverter element.
5. The target net (and thus all other nets in the path to the local clock/mode source) have null ("<>") or unknown ("–") phase expressions. With reference to FIG. 11, the target nets 1126, 1128, and 1130 of the target module 1108 have null ("<>") phase expressions.

FIG. 13 is a conceptual diagram that depicts the example phase algebra based circuit design evaluation with a compact multi-waveform representation after the tool extracts modes and clocks. FIG. 13 illustrates the virtual clocks and modes of modules I1:MYMACK 1316 and G:CLKGEN 1318 after the tool extracts phase expressions for signals for the module TOP 1108 from the specifications of the modules I1:MYMACK 1116 and G:CLKGEN 1118 of FIG. 11.

The specified phase expression [J@L] 1378 of signal 1370 remains unmapped as specified phase expression 1178 of signal 1170 of FIG. 11. The specified phase expression [K] 1380 of signal 1372 cannot be mapped to the propagated usage phase expression "^M1->^C1:0" 1380. The tool propagates the usage phase expressions 1378 and 1380 through the flip-flop 1390 to generate the phase expression "^M1->^C1@TPGF:?" 1382.

The tool extracts usage phase expression for signal SYSCLK 1334 as "~A" based on specified phase expression [~A] 1346 of signal ACLKB 1330. The tool propagates usage phase expression "~A" across the hierarchical boundary for module instance I1:MYMAC 1316 using hierarchical usage map 1408, resulting in usage phase expression "~^C1" 1346 of signal ACLKB 1330. The tool extracts usage phase expression for signal SYSDIS 1330 as "EN->0:1" 1336 based on specified phase expression [EN->0:1] 1348 of signal DISABLE 1342. The tool propagates usage phase expression "EN->0:1" across the hierarchical boundary for module instance I1:MYMAC 1316 using hierarchical usage map 1408, resulting in usage phase expression "^M1->0:1" 1348 of signal DISABLE 1342. The tool propagates usage phase expressions 1346 and 1348 through the NOR gate 1350, resulting in usage phase expression "^M1->^C1:0" 1335.

Since the flip-flop 1390 can propagate the usage phase expressions 1378 and 1380 to generate the usage phase expression 1382, the usage phase expression 1382 can then be mapped to a usage phase expression "^M1=>^C1@TPGF:?" 1364 using hierarchical usage map 1414. However, the specified phase expression of [A@TPGF] 1364 may not be mapped to the usage phase expression of "^M1=>^C1@TPGF:?" 1364. The tool propagates usage phase expressions 1364 and 1366 of signals 1358 and 1360 as inputs to flip-flop 1352 to generate resultant usage phase expression 1362 on signal 1368. The usage phase expression 1362 is then mapped to usage phase expression 1396 by using a hierarchical usage map 1408.

Figure 15:
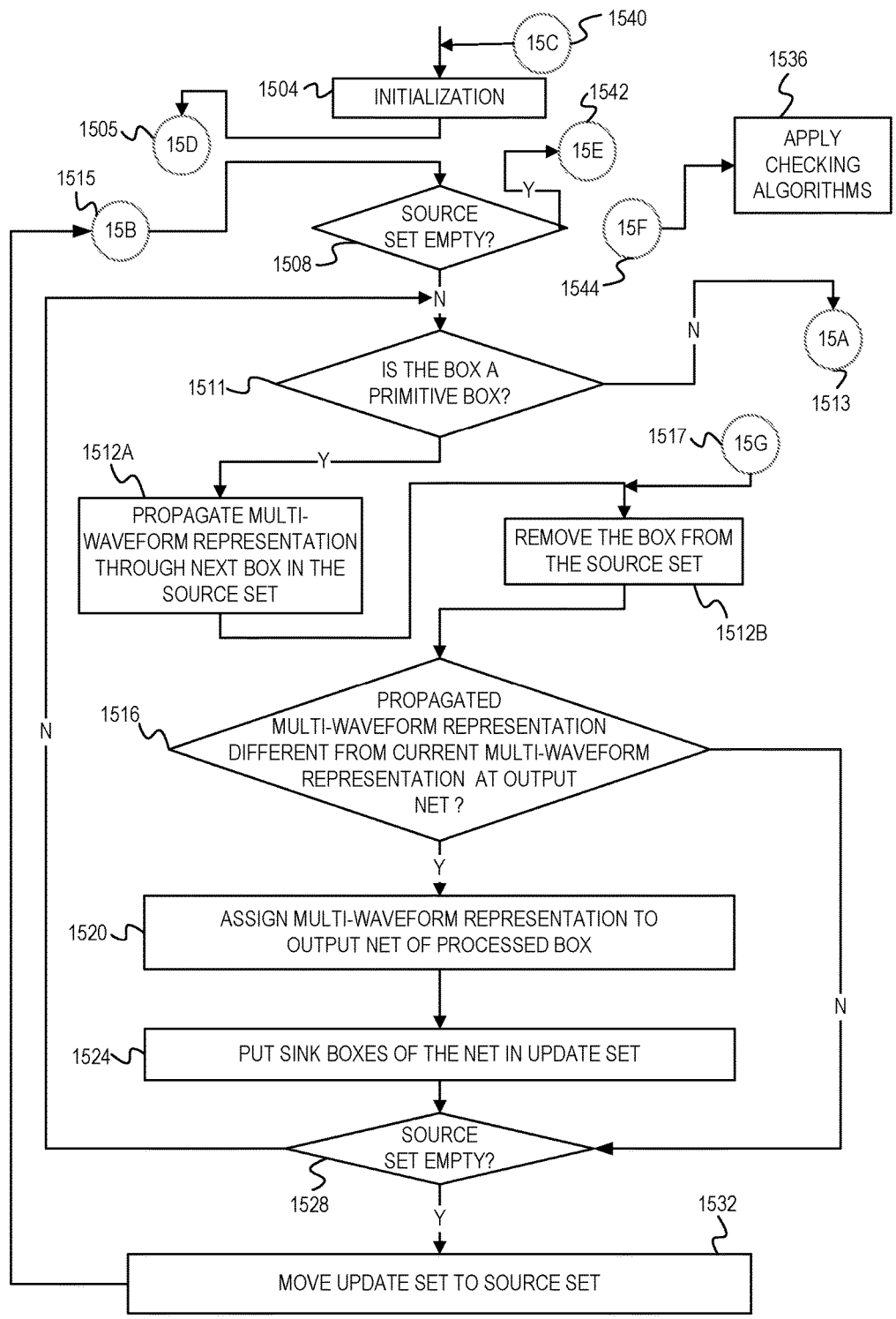
FIG. 15 is a flowchart of example operations for initializing an RTL circuit design representation of phase algebra based evaluation and propagation of compact multi-waveform representations throughout the design representation.
Figure 18:
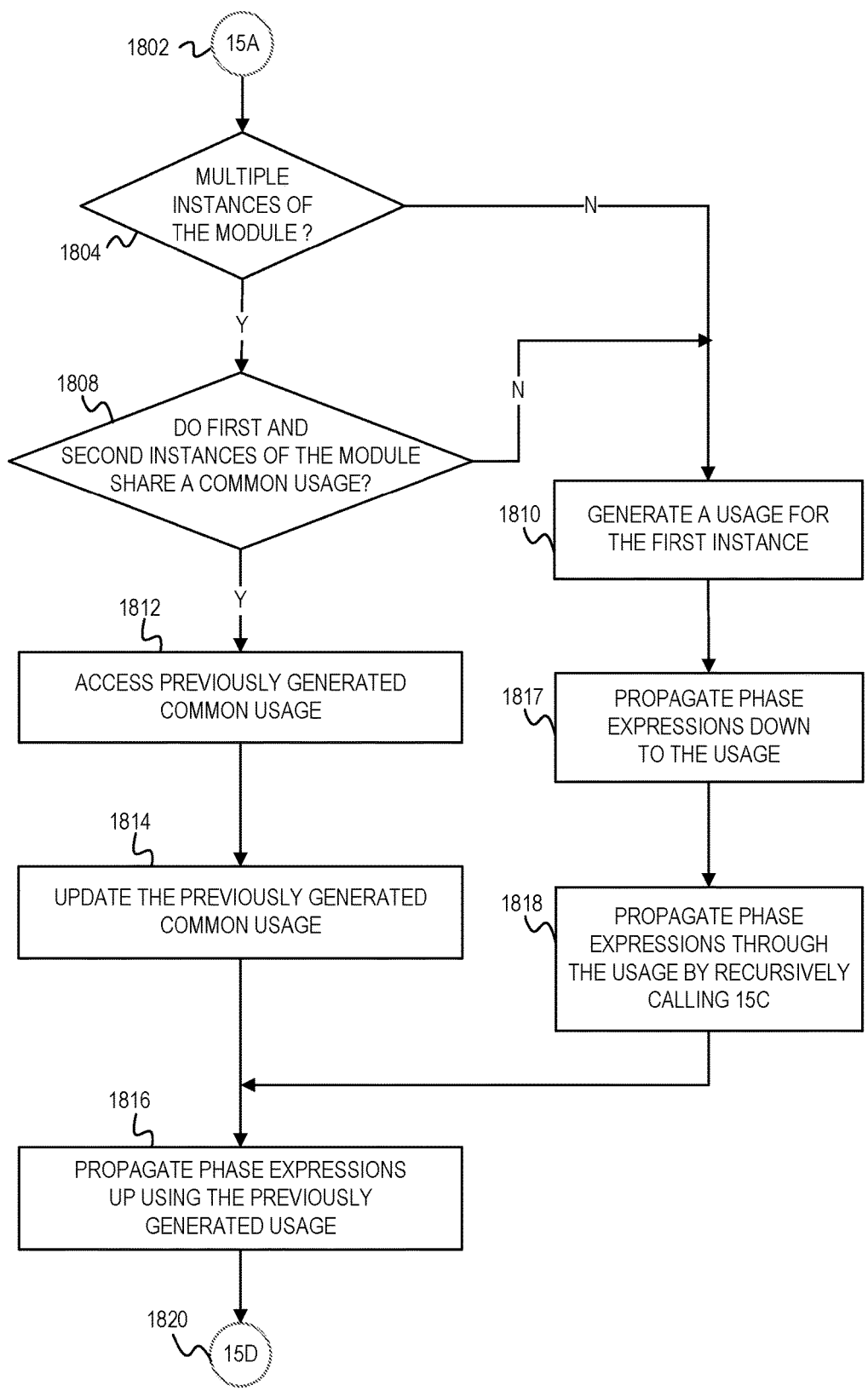
FIG. 18 is a flowchart of example operations for propagating multi-waveform representations using usages through hierarchical modules of an RTL circuit design representation

FIG. 15 is a flowchart of example operations for propagating multi-waveform representations after initialization of a circuit design representation. At block 1504, the circuit design representation is initialized, such as discussed in the U.S. patent application Ser. No. 14/651,539, The flowchart of FIG. 15 can be applied to a top level of a hierarchical design of a circuit design representation (e.g., modules TOP 108, 508, 708, 908, 1108, and/or 1308 of FIGS. 1, 5, 7, 9, 11, and 13, respectively). The flowchart of FIG. 15 can be performed in a recursive fashion, as illustrated by block 15A (corresponding to the flowchart of FIG. 18) being performed if the box being accessed is not a primitive. A primitive is an element that does not contain any other modules, i.e., that is not a hierarchical module or module instance. When the flowchart of FIG. 15 is performed recursively, it can be performed via the flow proceeding to block 15C 1540 from blocks 1818 (FIG. 18).

For example, the tool can start with the TOP module 508, and then processes each module instantiated in the TOP module 508, one at a time, as the tool processes each module instance. The processing of a module is done with respect to a particular instance encountered during the processing of the higher-level module, essentially using a depth-first traversal of a graph. Thus, FIG. 15 can be called recursively for each module usage in the hierarchical module TOP 508. In one embodiment, with reference to pseudocode discussed below, the flowchart of FIG. 15 corresponds to propagate_through_usage function.

Figure 16:
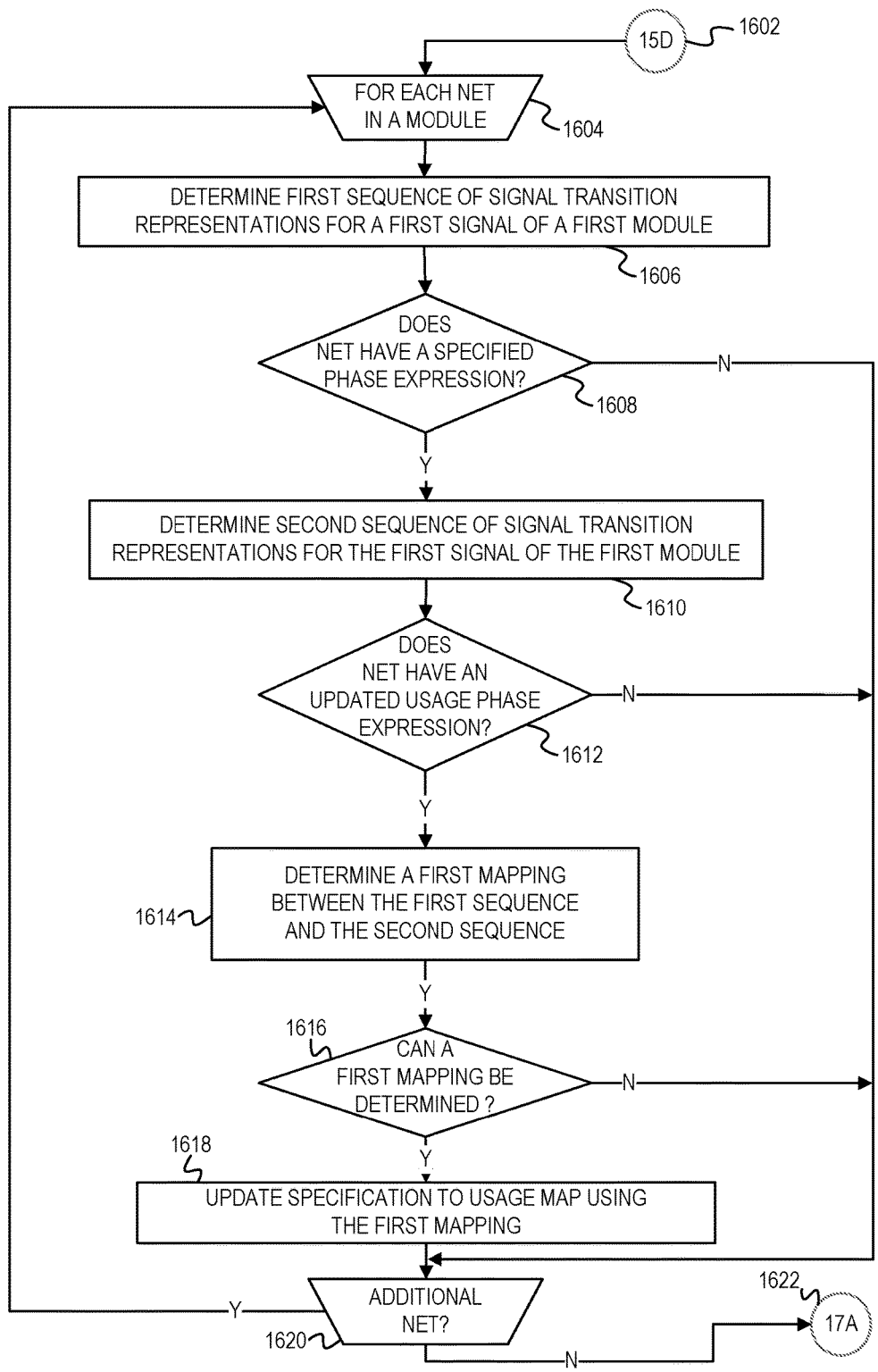
FIG. 16 is a flowchart of example operations for propagating multi-waveform representations through hierarchical modules of an RTL circuit design representation.

At block 1505, flow proceeds to FIG. 16 via block 15D. At block 1515, the flow proceeds to block 15B from FIG. 17 or from block 1532.

At block 1508, a source set is checked to determine whether it is empty. If the source set is empty, then the propagation process is complete and the flow proceeds to FIG. 19 via block 15E 1542. The flow proceeds to block 1536 from block 15F 1544. At block 1536, checking is applied to the resulting multi-waveform representation propagated throughout the design. The checking algorithms use the generated phase ids to identify particular characteristics associated with a design, some of which can be potential defects. If the source set was not empty at block 1508, the flow proceeds to block 1511.

At block 1511, the tool determines whether the next box in the source set is a primitive box. If the box is a primitive box, the flow proceeds to block 1512A. If the box is not a primitive box (i.e., the box is an instance box that corresponds to a module instance), the flow proceeds to block 1513 (i.e., element 15A via which the flow proceeds to the flowchart of FIG. 18).

At block 1512A, an input multi-waveform representation is propagated through the next box in a source set and the processed box is removed from the source set. The flow proceeds to block 1512A from block 1511. In one embodiment, block 1512A can be called (e.g., called in a manner similar to that of a function or a subroutine) from block 1511. At block 1512A, the input multi-waveform representation is propagated through the box by applying operators such as those of FIG. 2. For example, an input phase id is used to search for a result phase id in a lookup table. If a result phase id is found in the lookup table, then the result phase id is returned, and the process proceeds to block 1512B. The particular look up tables accessed will vary dependent upon the phase id and the operation (e.g., AND, OR, etc.) represented by the box. However, if a result phase id is not found in the lookup table, then the input phase id is converted to a ROLCMP in accordance with the phase id look-up algorithm. Operations then can be performed on the ROLCMPs. Phase expressions can be derived from the ROLCMP operations. The phase expressions can be converted into phase ids. At block 1512B, the processed box is removed from the source set. The flow can proceed to block 1512B from block 1512A or from block 15G 1517. The process proceeds to block 1516.

At block 1516, the multi-waveform representation resulting from block 1512 is compared to the multi-waveform representation currently associated with the output net of the processed box. If the resulting multi-waveform representation is different from the current multi-waveform representation, the flow proceeds to block 1520. Otherwise, the process proceeds to block 1528.

At block 1520, the multi-waveform representation resulting from block 1512 is assigned to the output net associated with the processed box. At block 1524, the sink boxes of the net are placed in the update set.

At block 1528, the source set is checked to determine whether it is empty. If the source set is not empty, then the flow again proceeds to block 1511 at which the next box in the source set is processed. Otherwise, the flow proceeds to block 1532. At block 1532, the source set is overwritten with the contents of the update set. The flow proceeds to block 15B 1515.

FIG. 16 is a flowchart of example operations for propagating multi-waveform representations after initialization of a circuit design representation. FIG. 16 may be performed from block 15D 1602 (e.g., by FIG. 15).

At 1604, the tool performs blocks 1606-1618 for each net in a module.

At 1606, the tool determines a first sequence of signal transition representations for a first signal of a first module. With reference to FIG. 5, the first sequence of signal transition representations can be a specified phase expression of signal 540.

At 1608, the tool determines whether the net has a specified phase expression. With reference to FIG. 5, the tool determines whether the net (i.e., the first signal as determined at block 1606) 546 has a specified phase expression of [~A]. If the net has a specified phase expression, the flow proceeds to block 1610. Otherwise, the flow proceeds to block 1620.

At 1610, the tool determines a second sequence of signal transition representations for the first signal of the first module. With reference to FIG. 5, the second sequence of signal transition representations can be a usage phase expression of the signal 540.

At 1612, the tool determines whether the net has an updated usage phase expression. With reference to FIG. 5, the tool determines whether the net (i.e., the first signal) 546 has a usage phase expression (which is "^C1")). The usage phase expression 546 can be mapped from the usage phase expression "SYS" 534 of its corresponding signal 534, and therefore can be updated relative to a previous usage phase expression of signal 540. If the net has an updated usage phase expression, the flow proceeds to block 1614. Otherwise, the flow proceeds to block 1620.

At 1614, the tool determines a first mapping between the first sequence and the second sequence. At 1616, the tool determines whether the first mapping can be determined, e.g., whether the first mapping is a valid mapping. With reference to FIGS. 5 and 6, the first mapping can be the specification to usage mapping A=>~^C1 606. If the first mapping can be determined, the flow proceeds to block 1618. Otherwise, the flow proceeds to block 1620.

At 1618, the tool updates the specification to usage mapping for the first and second sequences of signal transition representations using the first mapping determined at block 1614. With reference to FIGS. 5 and 6, the tool can update the specification to usage mapping 606 with the first mapping of A=>~^C1 606.

At 1620, the tool determines whether there are additional nets for the module. If there are additional nets, the flow proceeds to block 1604. Otherwise, the flow proceeds to FIG. 17 via block 17A 1622.

Figure 17:
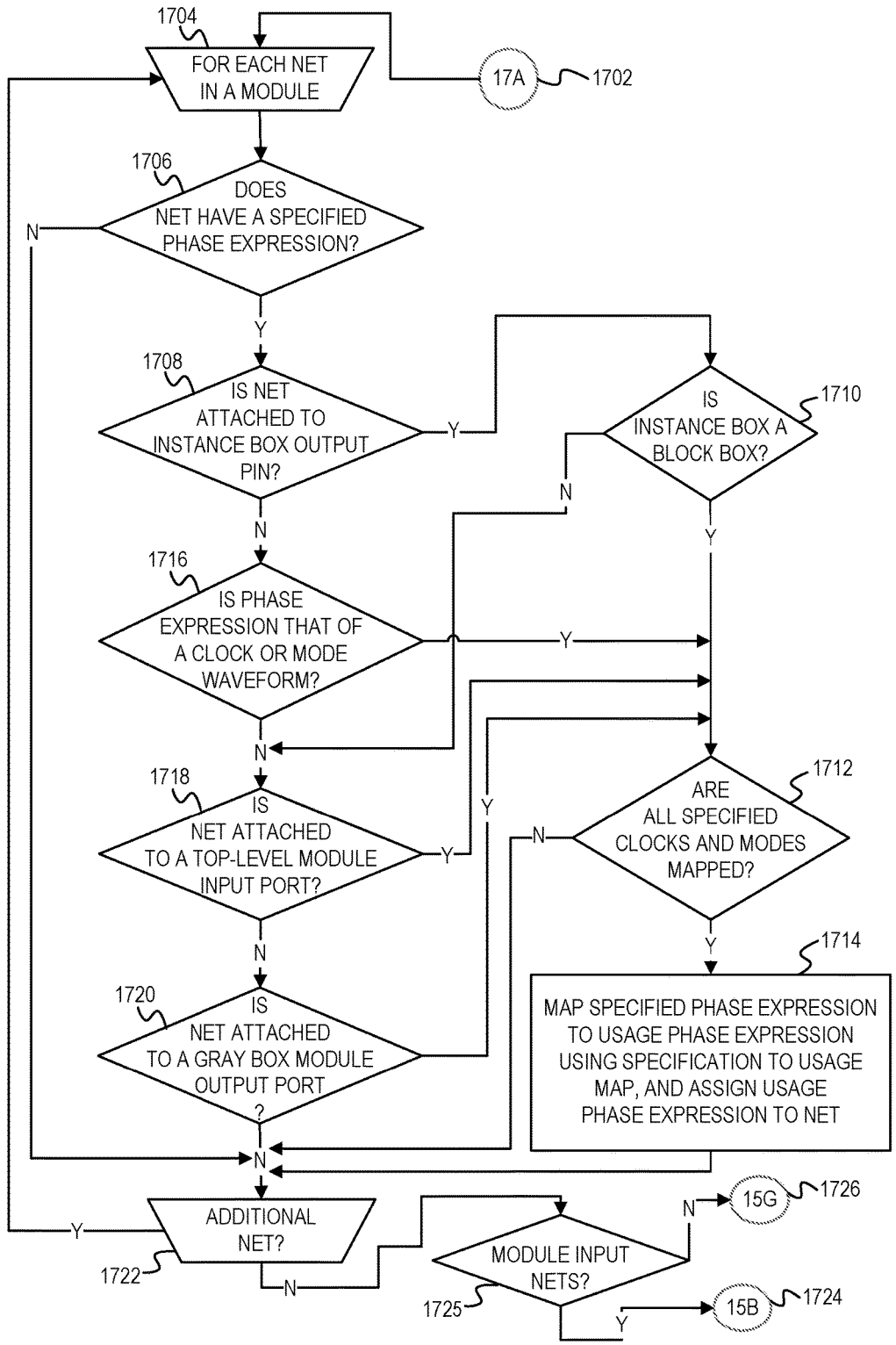
FIG. 17 is a flowchart of example initialization operations when propagating multi-waveform representations through hierarchical modules of an RTL circuit design representation.

FIG. 17 is a flowchart of example operations for propagating multi-waveform representations after initialization of a circuit design representation. FIG. 17 may be performed from element/block 17A 1702 (via FIG. 16).

At 1704, the tool performs blocks 1706-1722 for each net in a module.

At 1706, the tool determines whether the net has a specified phase expression. If the net has a specified phase expression, the flow proceeds to block 1708. Otherwise, the flow proceeds to block 1722.

At 1708, the tool determines whether the net is attached to an instance box output pin. If the net is attached to an instance box output pin, the flow proceeds to block 1710. Otherwise, the flow proceeds to block 1716.

At 1710, the tool determines whether the instance box is a block box. With reference to FIG. 9, the tool determines whether the instance box 918 is a black box. If the tool determines that the instance box is a black box, the flow moves to block 1712. If the tool determines that the instance box is not a black box, the flow moves to block 1718. It is noted that since the instance box 918 is a black box, its defining module is ignored by the tool.

At 1712, the tool determines whether all specified clocks and modes are mapped. If the tool determines that all specified clocks and modes are mapped, the flow moves to block 1714. Otherwise, the flow moves to block 1722.

At 1714, the tool maps the specified phase expression to the usage phase expression using the specification to usage map. The tool also assigns the usage phase expression to the net.

At 1716, the tool determines whether the specified phase expression is that of a clock or mode waveform. If the tool determines that the phase expression is that of a clock or mode waveform, the flow moves to block 1712. Otherwise, the flow moves to block 1718.

At 1718, the tool determines whether the net is attached to a top-level module input port. If the tool determines that the net is attached to a top-level module input port, the flow moves to block 1712. Otherwise, the flow moves to block 1720.

At 1720, the tool determines whether the net is attached to a gray box module output port. With reference to FIG. 7, the tool determines whether the module G:CLKGEN 718 is a gray box. If the tool determines that the first module is a gray box, the flow moves to block 1712. If the tool determines that the first module is not a gray box, the flow proceeds to block 1722.

At 1722, the tool determines whether there is an additional net for the module. If there are additional nets, the flow proceeds to block 1704. Otherwise, the flow proceeds to block 1725. At 1725, the tool determines whether module input nets are being processed. If module input nets are being processed, the flow proceeds to FIG. 15 via block 15B 1724. If module input nets are not being processed, e.g., if instance box output nets are being processed, the flow proceeds to FIG. 15 via block 15G 1726.

FIG. 18 is a flowchart of example operations for propagating multi-waveform representations (e.g., phase expressions) through hierarchical modules, or module usages.

At block 1802, the flowchart of FIG. 18 is accessed from block 15A 1802 (i.e., via FIG. 15). With reference to FIG. 5, the tool can access a module instance for flip-flop, that is the first box being processed by the flowchart of FIG. 15 (i.e., after processing the module TOP) that is a hierarchical box; i.e., a module instance. With regard to FIG. 18, the description of FIG. 18 supposes that each flip-flop is contained within a module called FLOP that is instantiated in place of the flip-flops 590 and 552.

At block 1804, the tool determines whether the defining module of the module instance that is currently being processed is associated with multiple instances. In one embodiment, the tool can determine if there are any instances of the module that have already been processed. In another embodiment, the tool can determine if there are multiple instances of the module in the circuit design representation, regardless of whether the other instances have been processed. With reference to FIG. 5 as an example, the tool determines whether the defining module of module instance for the flip-flop is associated with multiple instances. Depending on the implementation, the tool can determine whether the module instance has already been processed, or will be processed. If the module is associated with multiple instances, i.e., if there are two or more instances of a given module in the same parent module (i.e., in the parent module TOP) of the current design, then the flow proceeds to block 1808. If the module is not associated with multiple instances, then the flow proceeds to block 1810.

At block 1808, the tool determines whether the two instances of the same module share a common usage. The tool can make this determination is a variety of ways, such as by determining whether module instances of a register transfer level circuit design share a common usage, each instance being associated with a mapping (i.e., a hierarchical mapping). The two instances share the common usage if a sequence of signal transition representations received by the first instance can be mapped using a first hierarchical mapping to the same common sequence of signal transition representations as a hierarchical mapping of another sequence of signal transition representations received by the second instance using a second hierarchical mapping. In one embodiment, during this determination, the tool also maps down the phase expression as received by the current instance to the inputs of the previously generated usage. If the tool determines that the first and second instances do not share a common usage, then the flow proceeds to block 1810. If the tool determines that the first and second instances share the common usage, then the flow proceeds to block 1812.

In one embodiment, instead of the determinations of blocks 1804 and 1808, the tool determines whether there is an existing usage of the defining module that is compatible with the first instance. The tool can test every existing usage (if any exist) of the defining module. Thus, with reference to FIG. 5 as an example, the tool can determine whether there is an existing usage of the defining module FLOP that is compatible with the instance for flip-flop. If the tool determines that there is a compatible usage, then the flow proceeds to block 1812. If the tool determines that there is not a compatible usage, then the flow proceeds to block 1810.

At block 1812, the tool accesses the previously generated common usage. At block 1814, the tool updates the previously generated common usage. With reference to FIGS. 5 and 6, the tool can update any data structures associated with the common usage of the FLOP module, including an indication that the instances of both of the flip-flops share the same usage.

At block 1816, the tool propagates the phases up using results of the phase expressions previously propagated through the usage. The usage of block 1816 can be a common usage (via block 1814) or a previously generated usage (via block 1818). For the common usage, since the phase expression of the instance being processed does not need to be propagated through the common usage, the tool uses the results of a previous propagation (i.e., the propagation through the common usage that was previously performed for the second instance of the module) and uses the hierarchical mappings to generate the phase expression for the output. Once block 1816 is performed, the flow proceeds to block 1820 (i.e., to block 15D which corresponds to block 1602 of FIG. 16).

At 1810, the tool generates a usage for the first instance. At 1817, the tool propagates phase expressions down to the usage. At 1818, the tool propagates phase expressions through the usage by recursively calling block 15C of FIG. 15. The usage of blocks 1810 and 1818 can be an initial usage or a previously generated usage. The manner in which the phase usage expressions are generated and propagated through the usage is described in detail in the U.S. patent application Ser. No. 14/651,539.

Figure 19:
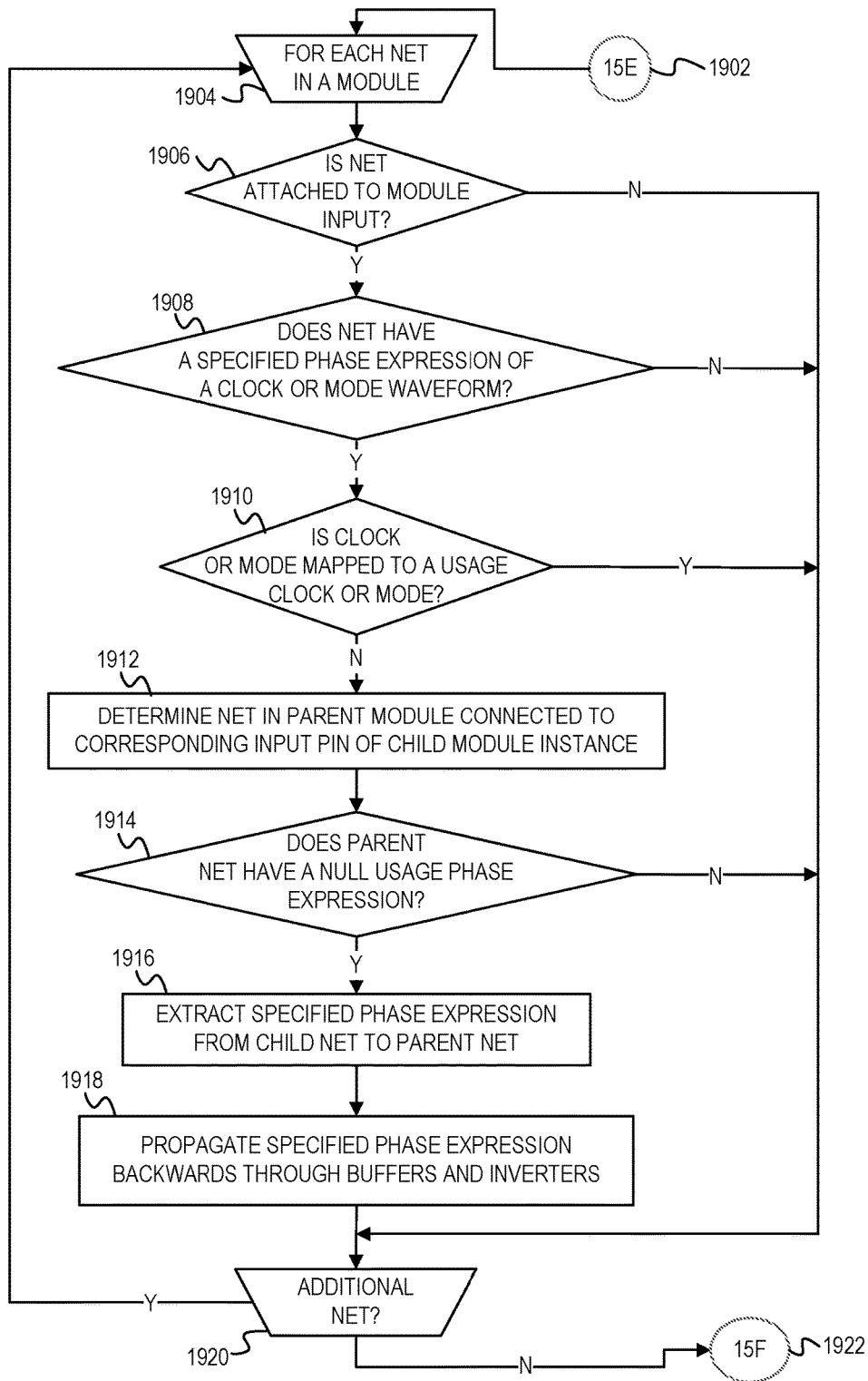
FIG. 19 is a flowchart of example operations for extracting modes and clocks through hierarchical modules of an RTL circuit design representation.

FIG. 19 is directed to example operations for extracting multi-waveform representations through hierarchical modules of an RTL circuit design representation. FIG. 19 may be performed from element/block 15E 1902 (via FIG. 15).

At 1904, the tool performs blocks 1906-1918 for each net in a module.

At 1906, the tool determines whether the net is attached to a module input. If the tool determines that the net is attached to a module input, then the flow proceeds to block 1908. Otherwise, the flow proceeds to block 1920. With reference to FIG. 11, the tool can determine that net 1130 of module I1:MYMAC 1116 is attached to a module input.

At 1908, the tool determines whether the net has a specified phase expression of a clock or wave waveform. If the tool determines that the net has a specified phase expression of a clock or mode waveform, then the flow proceeds to block 1910. Otherwise, the flow proceeds to block 1920. With reference to FIG. 11, the tool can determine net 1130 to have a specified phase expression of [~A] 1146, a clock waveform.

Figure 12:
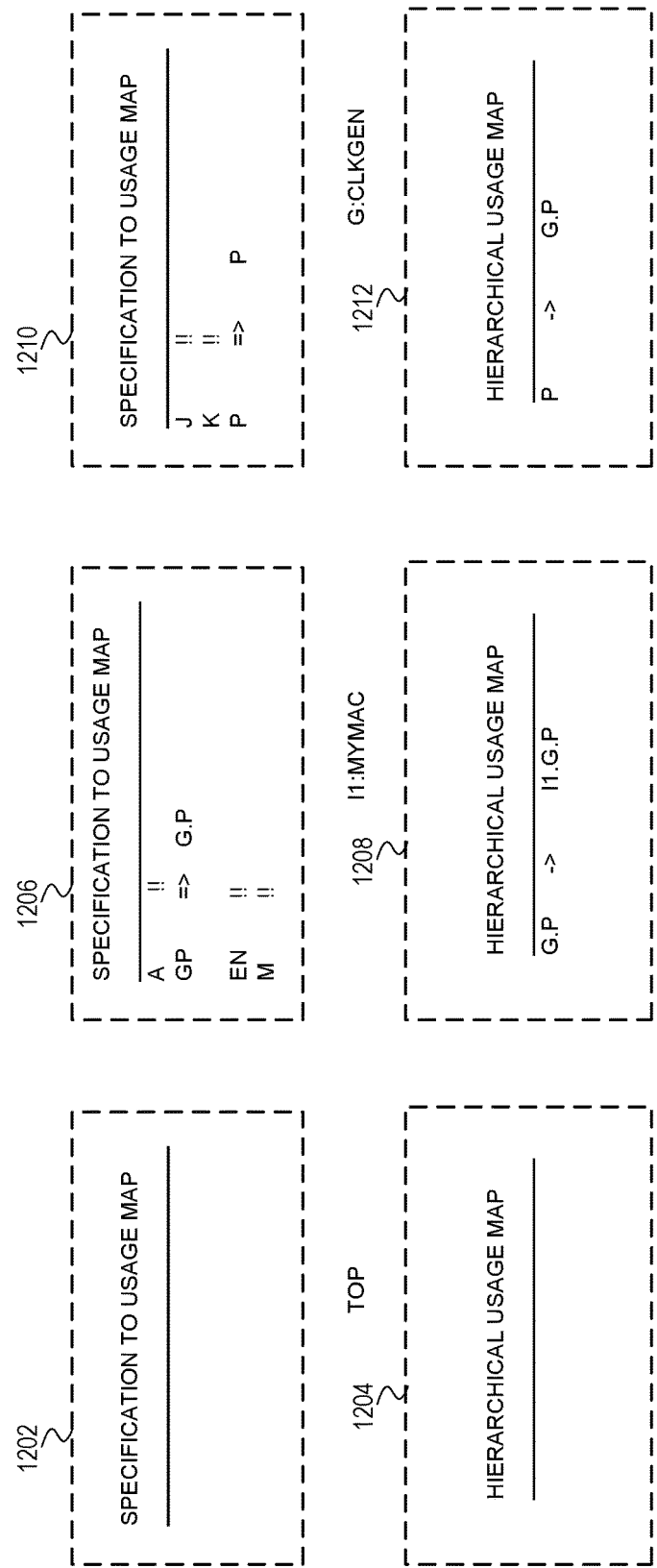
FIG. 12 is a conceptual diagram that depicts specification to usage mappings and hierarchical usage mappings of hierarchical modules of FIG. 11.

At 1910, the tool determines whether the clock or mode is mapped to a usage clock or mode. If the tool determines that the clock is mapped to a usage clock or mode, then the flow proceeds to block 1920. Otherwise, the flow proceeds to block 1912. With reference to FIGS. 11 and 12, the tool can determine that the phase expression 1146 has a clock A that is not mapped to a usage clock by specification to usage map 1206.

At 1912, the tool determines a net in a parent module that is connected to a corresponding input pin of a child module instance. With reference to FIG. 11, the tool can determine signal 1128 of parent module TOP 1108 that is connected to a corresponding pin of the child module instance I1:MYMAC 1116.

At 1914, the tool determines whether the parent module has a null usage phase expression. If the parent module has a null usage phase expression (e.g., a "<>" usage expression) then the flow proceeds to block 1916. Otherwise, the flow proceeds to block 1920. With reference to FIG. 11, the tool can determine that a usage phase expression 1134 of signal 1128 is null.

At 1916, the tool extracts the specified phase expression from the child net to the parent net. With reference to FIG. 13, the tool can extract the specified phase expression of [~A] 1346 of the child net 1330 to a phase expression 1334 of the parent net 1328.

At 1918, the tool propagates the specified phase expression backwards through buffers and inverters.

At 1920, the tool determines whether there is an additional net for the module. If there is an additional net, the flow proceeds to block 1904. Otherwise, the flow proceeds to FIG. 15 via block 15F 1922.

Thus, the tool can initially propagate the null sequence though the child module from the parent module. With reference to FIG. 11, the tool can propagate the null phase expression 1134 of the first signal 1128 through the child module, i.e., as a null phase expression for the usage phase expression of its corresponding signal ACLKB 1130. The tool can map the usage phase expression of signal ACLKB 1146 from the null phase expression 1134 of signal SYSCLK of module TOP 1108. The tool can propagate the null sequence of the usage phase expression 1146 through the NOR gate 1150. The resultant phase expression 1135 is thus also null. Since the phase expression being propagated are null, the mappings 1202-1204 are empty.

The tool can then extract non-null sequences of signal transition representations based on the first sequence to generate an extracted first sequence. With reference to FIG. 13, the tool can also extract a non-null usage phase expression for signal SYSCLK 1328 as "~A" 1334 based on the specified phase expression [~A] 1346 for the signal 1330. The tool can also map a non-null usage phase expression for signal ACLKB 1330 as "^C1" based on the specified phase expression [~A]. The usage phase expression 1336 can be similarly extracted from the specified phase expression 1348 of [EN->0:1]. Thus, the tool can perform the clock and/or mode extraction of usage virtual clock A and of usage mode EN for the module TOP 1308 from the specified clock A and the specified mode EN of the module I1:MYMAC 1116.

Once the clocks and modes are extracted, the tool again propagates the phase expressions through all of the hierarchical modules of the module TOP 1308, this time using the extracted phase expressions instead of the null phase expressions. During the propagation process, the specification to usage maps 1406 and 1410 are populated to reflect the extraction. The hierarchical usage maps 1408 and 1414 are similarly populated.

In some embodiments, the propagation algorithm described above with reference to FIGS. 15-19 is divided into the following eleven named procedures.

create_initialized_usage
record_phase_id
propagate_through_usage
propagate_through_instance_box
propagate_phases down
propagate_phases up
infer_specification_map
find_extraction_candidates
initialize_usage_for_extraction
extract_clocks_and_modes
check_conflicts Each procedure is listed in a section below. In some embodiments, the procedures operate on associative data structures (data objects) that store data associated with the circuit design. An associative data structure stores data values that are each associated with a unique key. The procedures use the syntax associative$_{13}$ data$_{13}$ structure [key] to refer to the data value associated with the given key. A key may be compound, meaning, that it consists of a sequence of values. In the procedure listings, the term "iff" means "if and only if", and the characters "//" precede a comment. The algorithm is performed on a given hierarchical design by the following two-step pseudocode, which calls four of the named procedures:

Let top_usage_id=create_initialized_usage (top_level_module).
Call propagate_through_usage (top_usage_id).
Call extract_clocks_and_modes (top_usage_id).
Call check_conflicts (top_usage_id).

The propagate_through_usage procedure indirectly recursively calls itself for all the underlying usages in the design, propagating phase expressions through each. At the completion of the above pseudocode, phase expressions will be propagated to all nets in the hierarchical design.

Procedure create_initialized_usage—the following procedure creates a new usage of a module, and initializes the phase IDs for all nets in the module. It returns the ID of the new usage.

--- procedure create_initialized_usage

--- formal argument: module_id
returns: new usage_id
{
Let usage_id = a new, unused usage ID for the module referenced by module_id.
for each instance box in the module referenced by module_id
    {
    // Mark instance box as updated so it will be assigned a usage.
    Add instance box to module_updated_boxes [ module_id ].
    }
for each specified virtual clock and mode in the given module {
    {
    (if it is externally-sourced and module_id refers to top-level module,
        OR it is internally-sourced and has a local source net NOT sourced by an instance box,

```
procedure create_initialized_usage

OR it is internally-sourced and has a black-boxed sourcing instance box)
        { // Map specified virtual clocks/mode to defined usage virtual clock/mode
        Let virtual_clock_or_mode_name = specified name of this virtual clock or
                mode.
        Add virtual_clock_or_mode_name to usage_virtual_clocks [usage_id] or
                usage_modes [usage_id].
        Set usage_spec_map [usage_id, virtual_clock_or_mode_name] = virtual
                _clock_or_mode_name.
        }
    }
    for each net in the module referenced by module_id
    {
        if ( net is driven by tie-down or tie-up )
            {
            Let phase_expr = "0" or "1", respectively.
            }
        else if (net has a specified phase expression, and all virtual clocks and modes it
                references (if any) have an entry in usage_spec_map (due to previous for
                loop), and net is a phase seeding signal )
            {
            Let phase_expr = the specified phase expression.
            }
        else if ( net is connected to an input port and module_id refers to the top-level
        module )
            {
            Let phase_expr = "<>".
            }
        else if ( net is connected to the output of a clock generator )
            {
            Let phase_expr = "<>".
            }
        else if ( net is connected to the output of a black-boxed instance box )
            {
            Let phase_expr = "<>".
            }
        else if (net is sourceless, or is connected to the output port of a gray box module)
            {
            Let phase_expr = "<>".
            }
        else
            {
            Let phase_expr = "-".
            }
        Call record_phase_id ( usage_id, net, phase ID corresponding to phase_expr ).
    } // end for each net
    Return usage_id.
} // end procedure create_initialized_usage
```

Procedure record_phase_id—the following procedure is called whenever the phase ID assigned to a net is initialized or potentially updated. The net argument refers to one net (signal) within the module used by the usage_id argument. The purpose of this procedure is not only to record the net's phase ID, but to mark any downstream boxes or ports which may be affected by the net's update, so that they will subsequently be processed. The term "sink box" is used to mean any box (primitive component or instance box) that has an input pin connected to the given net.

```
procedure record_phase_id formal arguments: usage_id, net, phase_id
{
Let module_id = ID of module used by usage_id (which contains the given net).
Let Boolean flag is_update = false.
if ( usage_net_phase_id [ usage_id, net ] has not been initialized )
        {
        Set usage_net_phase_id [ usage_id, net ] equal to phase_id.
        Set is_update = true iff phase_id is not the phase ID for "-".
        }
else if ( usage_net_phase_id [ usage_id, net ] stores a value other than phase_id )
        {
        if ( net has a seeding usage phase expression ) {
        // Implies an "override" or extracted clock/mode;
        leave phase ID assigned to net unchanged.
        else
                {
                Set usage_net_phase_id [ usage_id, net ] equal to phase_id.
```

```
                    procedure record_phase_id
                    Set is_update = true.
                }
        }
if ( is_update is true )
        {
        for each sink box of net
                {
                Add sink box to module_updated_boxes [ module_id ].
                if ( sink box is an instance box )
                        {
                        Let input_pin = pin of instance box connected to net.
                        Add input_pin to module_updated_instance_pins [ module_id, sink
                        box ].
                        }
                } // end for each sink box
        if ( net is connected to an output port of the module referenced by module_id )
                {
                Add output port to module_updated_output_ports [ module_id ].
                Set usage_port_phase_id [ usage_id, output port ] equal to phase_id.
                }
        }
} // end procedure record_phase_id
```

Procedure propagate_through_usage—the following procedure will propagate phase IDs through the specified usage, and will indirectly recursively call itself for each child usage, via the call to propagate_through_instance_box.

```
                    procedure propagate_through_usage
formal argument: usage_id
{
Let module_id = ID of module used by usage_id.
// Propagate updates from above (via input ports), if any.
for each input_port in module_updated_input_ports [ module_id ]
        {
        Let input_net = net connected to input_port.
        Call record_phase_id ( usage_id, input_net,
        usage_port_phase_id [ usage_id, input_port ] ).
        if ( input_net has a specified phase expression )
                {
                Call infer_specification_map ( usage_id, input_net ).
                }
        }
Set module_updated_input_ports [ module_id ] equal to the empty set.
// Perform clock and mode extraction if needed.
if ( extraction_mode
        AND usage_id is in usage_extraction_within set
        AND usage_id is not in usage_proc_for_extraction set )
                {
                Call initialize_extraction_in_usage ( usage_id ).
                Add usage_id to usage_proc_for_extraction set.
                }
// Propagate from boxes updated by initialization and propagation from input ports.
Let source_set = module_updated_boxes [ module_id ].
while ( source_set is not empty )
        {
        Set module_updated_boxes [ module_id ] to the empty set.
        for each box in source_set
                {
                if (box is primitive box)
                        {
                        Let phase_id = the phase ID evaluated for the box output as a function
                                of the phase IDs assigned to its input nets
                        // (stored in usage_net_phase_id)
                        Call record_phase_id ( usage_id, net connected to box output,
                        phase_id ).
                        }
                else
                        { // box is instance box
                        Call propagate_through_instance_box ( usage_id, box ).
                        }
```

| procedure propagate_through_usage |
|---|

```
                } // end for
        Set source_set equal to module_updated_boxes [ module_id ].
        } // end while
} // end procedure propagate_through_usage
```

Procedure propagate_through_instance_box—the following sub-procedure is called by the previous propagation procedure to propagate phase IDs through an instance box. It in turn calls the previous procedure (indirect recursion) for the usage ID assigned to the instance box.

| procedure propagate_through_instance_box |
|---|

```
formal arguments: usage_id, instance_box
{
Let module_id = ID of instantiating module of instance_box (module used by usage_id)
Let child_module_id = ID of defining module of instance_box.
Test each existing usage of module child_module_id for compatibility with instance_box.
if ( found a compatible usage (and therefore a consistent virtual clock and mode map) )
        {
        Set usage_instance_box_usage [usage_id, instance_box] to the compatible usage's
                ID.
        for each virtual_clock_or_mode_name referenced by instance_box input phase
                expressions
                {
                Set usage_instance_box_map [usage_id, instance_box, virtual_clock_or_mode_name]
                        to the lower-level virtual clock or mode, or its inversion, that was assigned by the consistent
map
                        found for the compatible usage (which may be an extension of a
                        previous map, in which case some values will not change).
                }
        Set module_updated_instance_pins [ module_id, instance_box ] to the empty set.
        Add all output ports of child_module to module_updated_output_ports
                [ child_module_id ].
        }
else {
        // There is no existing usage compatible with instance_box.
        if ( there is no usage already assigned to instance_box )
                {
                Let child_usage_id = create_initialized_usage (child_module_id).
                Set usage_instance_box_usage [usage_id, instance_box] = child_usage_id.
                }
        else
                {
                Let child_usage_id = usage_instance_box_usage [usage_id, instance_box].
                if ( child_usage_id is assigned to (shared by) any other instance in the design)
                        {
                        Create a clone of child_usage_id by copying all data for child_usage_id
                                to a new previously unused usage ID for module
                                child_module_id (see below).
                        Set usage_instance_box_usage [usage_id, instance_box] to the ID
                                of the clone.
                        Set child_usage_id to the ID of the clone.
                        }
                }
        Call propagate_phases_down ( usage_id, instance_box, child_usage_id ).
        Recursively call propagate_through_usage ( child_usage_id ).
        }
Call propagate_phases_up ( usage_id, instance_box, child_usage_id ).
} // end procedure propagate_through_instance_box
```

In one implementation, the phrase "copying all data" means that, for each of the following data objects, for any entry indexed (in part) by the child_usage_id, the tool creates a duplicate entry that is instead indexed by the new, previously unused ID:
  usage_virtual_clocks
  usage_modes
  usage_spec_map
  usage_instance_box_usage
  usage_instance_box_map
  usage_net_phase_id
  usage_port_phase_id
  usage_extraction_candidates
  usage_extraction_within
  usage_proc_for_extraction However, if no compatible usage is found, then no two instances of a module will share a usage.

Procedure propagate_phases_down—the following sub-procedure is called by propagate_through_instance_box to propagate phase IDs from the inputs of an instance box to the input ports of its assigned usage.

---
procedure propagate_phases_down
---

```
formal arguments: usage_id, instance_box, child_usage_id
{
Let module_id = ID of instantiating module of instance_box (module used by usage_id).
Let child_module_id = ID of defining module of instance_box (module used by child_usage_id).
for each input_pin in module_updated_instance_pins [ module_id, instance_box ]
        {
        Let phase_id = usage_net_phase_id [ usage_id, net connected to input_pin ].
        Let child_input_port = input port of child_module corresponding to input_pin.
        for each virtual_clock_or_mode_name referenced by phase_id
                {
                if ( virtual_clock_or_mode_name has not been mapped for this instance
                        box )
                        {
                        Let from_above_name = next available from-above name for
                        child_usage_id
                        // (e.g., ^C1, ^C2, for virtual clocks; ^M1, ^M2, for modes).
                        Add from_above_name to usage_virtual_clocks [child_usage_id]
                                or usage_modes [child_usage_id], as appropriate.
                        Set usage_instance_box_map [usage_id, instance_box, virtual_clock_or_mode_name] =
                                from_above_name.
                        }
                }
        Let child_phase_id = mapping of phase_id down to the child usage.
        Set usage_port_phase_id [ child_usage_id, child_input_port ] equal to
                child_phase_id.
        Add child_input_port to module_updated_input_ports [ child_module_id ].
        }
Set module_updated_instance_pins [ module_id, instance_box ] to the empty set.
} // end procedure propagate_phases_down
```

Procedure propagate_phases_up—the following sub-procedure is called by propagate_through_instance box to propagate phase IDs from the output ports of the usage assigned to an instance box, to the nets connected to the outputs of the instance box.

---
procedure propagate_phases_up
---

```
formal arguments: usage_id, instance_box, child_usage_id
{
Let child_module_id = ID of defining module of instance_box (module used by child_usage_id).
for each child_output_port in module_updated_output_ports [ child_module_id ]
        {
        Let child_phase_id = usage_port_phase_id [ child_usage_id, child_output_port ].
        for each child_virtual_clock_or_mode_name referenced by child_phase_id that
                        has not been mapped for this instance box (thus has origin of from_current
                        or from_below)
                {
                Let from_below_name = virtual clock or mode name for usage_id, corresponding
                        to child_virtual_clock_or_mode_name (prepended with
                        instance name if virtual clock or mode originates from below)
                Add from_below_name to usage_virtual_clocks [usage_id] or usage_modes
                        [usage_id], as appropriate.
                Set usage_instance_box_map [usage_id, instance_box, from_below_name] =
                        child_virtual_clock_or_mode_name.
                }
        Let phase_id = mapping of child_phase_id up to the current usage (usage_id).
        Let output_net = net connected to output pin of instance_box corresponding to
                child_output_port.
        Call record_phase_id ( usage_id, output_net, phase_id ).
        if ( output_net has a specified phase expression )
                {
                Call infer_specification_map ( usage_id, output_net ).
                }
        }
Set module_updated_output_ports [ child_module_id ] to the empty set
} // end procedure propagate_phases_up
```

Procedure infer_specification_map sub-procedure attempts to map specified virtual clocks and modes referenced by a given signal's specified phase expression, that have not yet been mapped. It is called by propagate_through_usage for module input signals, for which it may map specified externally sourced virtual clocks and modes to derived-from-above virtual clocks or modes. It is also called by propagate_phases_up for instance output signals, for which it may map specified internally-sourced virtual clocks and modes to derived-from-below virtual clocks or modes.

--- procedure infer_specification_map

---

```
formal arguments: usage_id, net
{
// Find specification map extension
Let Boolean flag was_extended = false.
Let spec_phase_id = phase ID for specified phase expression for given net.
Let unmapped_spec_virtual_clocks = set of virtual clocks referenced by spec_phase_id
        that are not yet mapped by usage_spec_map [usage_id].
Let unmapped_spec_modes = set of modes referenced by spec_phase_id that are not yet
        mapped by usage_spec_map [usage_id].
if ( either unmapped_spec_virtual_clocks or unmapped_spec_modes is not empty )
        {
        Let usage_phase_id = usage_net_phase_id [usage_id, net].
        Let usage_virtual_clocks = set of usage virtual clocks referenced by usage_phase_id.
        Let usage_modes = set of usage modes referenced by usage_phase_id.
        Iterate through all possible mappings from unmapped_spec_virtual_clocks to usage_virtual_clocks,
                their inverses, 0 and 1, and from unmapped_spec_modes
                        to usage_modes, their inverses, 0 and 1, and check if there is exactly one mapping that, when combined
                        with existing mappings in usage_spec_map [usage_id], maps spec_phase_id
                        to a usage phase ID that is "compatible" (see note) with usage_phase_id.
        if ( there is such a unique extension )
                {
                Add mappings for unmapped_spec_virtual_clocks and unmapped_spec_modes
                        to usage_spec_map [usage_id] accordingly.
                Set was_extended = true.
                }
        }
if ( was_extended )
        {
        // See if new mappings result in seeding phase specifications (e.g., at black
                box outputs).
        for each phase seeding net in module used by usage_id {
        if ( net has specified phase expression that references previously unmapped
                virtual clocks or modes )
                {
                Let spec_phase_id = phase ID for specified phase expression for
                        the phase seeding net.
                if ( all virtual clocks or modes referenced by spec_phase_id have
                        now been mapped by usage_spec_map [usage_id] )
                        {
                        Let mapped_phase_id = spec_phase_id mapped by usage_spec_map
                                [usage_id].
                        Call record_phase_id ( usage_id, net, mapped_phase_id ).
                        }
                }
            }
        }
} // end procedure infer_specification_map
```

In the above sub-procedure infer_specification_map, the term "compatible" used in the procedure can mean that two phase IDs (or their corresponding phase expressions) are identical; or it can mean that they are not identical but have a relationship that is acceptable from a specification standpoint. For example, a net may have a specification that it is an unknown constant (phase expression "?"), but is propagated a constant 0 phase ID. This would be deemed "acceptable" because the net's behavior is a subset of the specified behavior.

The find_extraction_candidates sub-procedure searches for any unmapped specified externally sourced observable virtual clocks or modes, and determines whether they can possibly be extracted. It populates the usage_extraction_candidates and usage_extraction_within data object accordingly. It recursively calls itself to process the entire design hierarchy.

```
procedure find_extraction_candidates formal argument: usage_id
return type: set of pairs of the form ( input_port, phase_expression )
{
Let Boolean flag candidates_within = false.
Let set_of_pairs be the empty set.
for each specified externally sourced observable virtual_clock_or_mode in module used
            by usage_id
            {
            Let input_net = local clock or mode source net for virtual_clock_or_mode.
            if ( usage_spec_map [usage_id] does not contain mapping for virtual_clock_or_mode
                        and usage_net_phase_id [usage_id, input_net] ==
                        phase ID for "□" or "◇" )
                        {
                        Add the pair ( input port corresponding to input_net, specified phase expression
                        for input_net ) to set_of_pairs.
                        }
            }
for each instance_box in the module used by usage_id
            {
            Let child_usage_id = usage_instance_box_usage [usage_id, instance_box].
            Let child_set_of_pairs = find_extraction_candidates ( child_usage_id ).
            for each pair ( child_input_port, child_phase_expr ) in child_set_of_pairs
                        {
                        Let candidate_net = net attached to instance input pin corresponding to
                                    child_input_port.
                        if ( usage_net_phase_id [usage_id, candidate_net] == phase ID for "□" or
"◇" ) {
                                    while ( candidate_net is output of buffer or inverter )
                                                {
                                                Set candidate_net = net attached to input of buffer or inverter.
                                                }
                                    if ( candidate_net is connected to a module input port )
                                                {
                                                if ( set_of_pairs does not contain a pair with candidate_net )
                                                            {
                                                            Add the pair ( candidate_net, child_phase_expr ) to
                                                set_of_pairs.
                                                            }
                                                }
                                    else if ( usage_extraction_candidates [usage_id, candidate_net] is unassigned)
                                                {
                                                Set usage_extraction_candidates [usage_id, candidate_net] =
                                                            child_phase_expr.
                                                Set candidates_within = true.
                                                }
                                    }
                        }
            if ( child_usage_id is in set usage_extraction_within )
                        {
                        Set candidates_within = true.
                        }
            }
if ( candidates_within is true )
            {
            Add usage_id to the usage_extraction_within set.
            }
Return set_of_pairs. // Should be empty if usage_id is for top-level module
} // end procedure find_extraction_candidates
```

The initialize_extraction_in_usage procedure applies the extracted clock or mode phase expressions on the candidate target nets in the current module usage. It also marks instance boxes that contain extraction candidate target nets as updated, so they will be processed recursively by procedure propagate_through_usage.

---
procedure initialize_extraction_in_usage
---
```
formal argument: usage_id
{
Let module_id be the ID for the module referenced by usage_id.
for each instance box in the module referenced by module_id
        {
        Let child_usage_id = usage_instance_box_usage [usage_id, instance_box].
        if ( child_usage_id is in usage_extraction_within set )
                {
                // Mark instance box as updated so it will be processed.
                Add instance box to module_updated_boxes [module_id].
                }
        }
for each net for which there is a value for usage_extraction_candidates [usage_id, net]
        {
        if ( usage_net_phase_id [usage_id, net] == phase ID for "☐" or "<>")
                {
                Let descendant_phase_expr = usage_extraction_candidates [usage_id,
                        net].
                Let extracted_clock_or_mode = new usage virtual clock or mode based on
                        the clock or mode referenced by descendant_phase_expr (ensuring
                        name is unique).
                Add extracted_clock_or_mode to usage_virtual_clocks [usage_id] or usage_modes
                        [usage_id].
                Let usage_phase_id = phase ID corresponding to descendant_phase_expr,
                        substituting extracted_clock_or_mode for the referenced clock or
                        mode.
                Call record_phase_id ( usage_id, net, usage_phase_id ).
                }
        }
}
```
---

Note that extraction at a higher level may result in new phase expressions propagating down to nets that had been identified as extraction candidates at lower levels, making them no longer candidates. That is why the initialize_extraction_in_usage checks that each net still has the null or unknown phase expression before performing the extraction.

The sub-procedure extract_clocks_and_modes attempts to extract virtual clocks and modes. It first indentifies candidate target nets for extraction by calling the find_extraction_candidates subprocedure. It will repropagate phase expressions through the module hierarchy by calling the propagate_through_usage procedure, which calls initialize_extraction_in_usage for all usages that contain extraction candidate target nets in the usage being processed or in descendant module usages.

---
procedure extract_clocks_and_modes
---
```
formal argument: usage_id
{
        Set extraction_mode = true.
        Set usage_proc_for_extraction to the empty set.
        Call find_extraction_candidates ( usage_id ).
        Call propagate_through_usage ( usage_id ).
}
```
---

The following sub-procedure check_conflicts checks for inconsistencies between specified phase expressions and propagated usage phase expressions.

---
procedure check_conflicts
---
```
formal argument: usage_id
{
for ( each net in module used by usage_id that has a specified phase expression )
        {
        Let spec_phase_id = the phase ID for the specified phase expression.
        if ( all virtual clocks or modes referenced by spec_phase_id have been mapped by
                usage_spec_map [usage_id] )
                {
                Let mapped_phase_id = phase ID mapped from spec_phase_id using mappings
                        in usage_spec_map [usage_id].
                if ( usage_net_phase_id [usage_id, net] is not "compatible" (see note under
                        infer_specification_map) with mapped_phase_id )
                        {
                        Report conflict between propagated phase ID and specified phase
                                ID.
                        // Note: this should not happen for "seeding" phase specifications.
```

```
                  procedure check_conflicts
                        }
                }
        else {
                Report error due to unmapped specified virtual clock or mode.
                }
        }
}
// Process child instances recursively
for ( each instance_box in module used by usage_id )
        {
        Let child_usage_id = usage_instance_box_usage [usage_id, instance_box].
        Call check_conflicts ( child_usage_id ).
        }
} // end procedure check_conflicts
```

Figure 20:
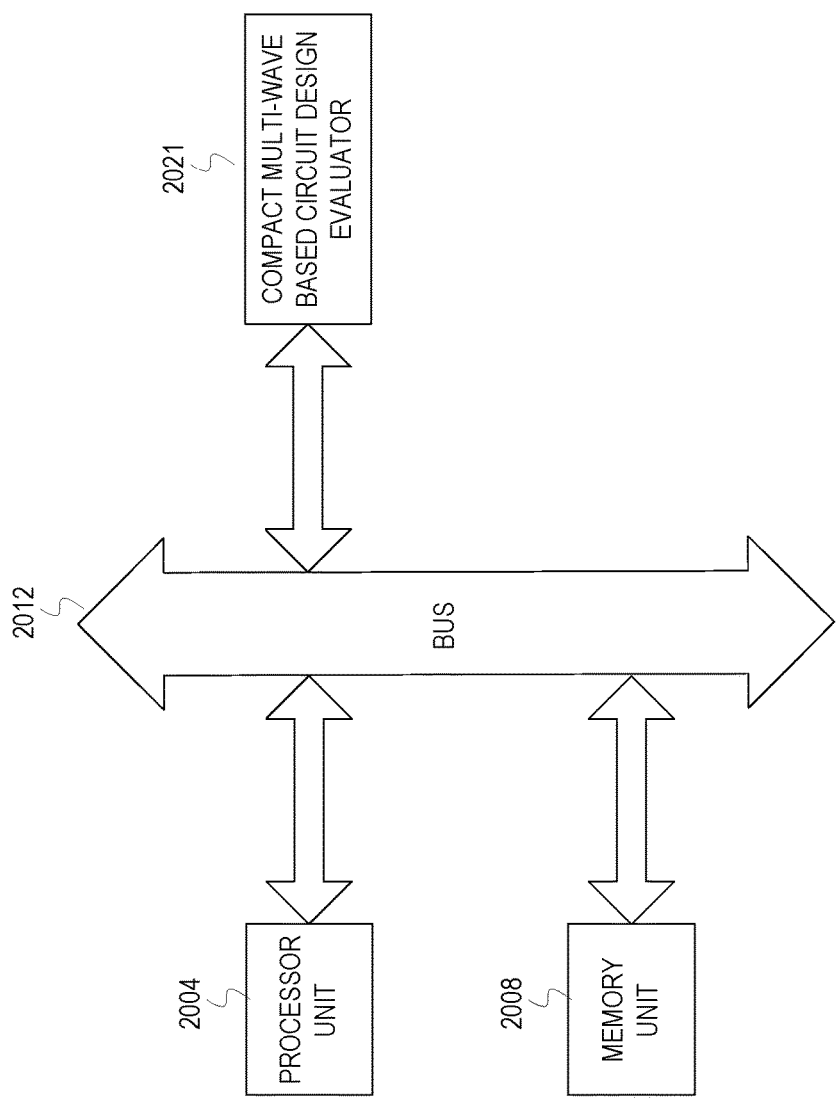
FIG. 20 depicts an example computer system including a compact multi-wave based circuit design evaluator.

FIG. 20 depicts an example computer system compact multi-wave based circuit design evaluator. A computer system includes a processor unit 2004 (possibly including multiple processors, multiple cores, multiple nodes, and/or implementing multi-threading, etc.). The computer system includes a memory unit 2008. The memory unit 2008 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 2012 (e.g., PCI bus, ISA bus, PCI-Express bus, HyperTransport® bus, InfiniBand® bus, NuBus, etc.). The computer system also includes a compact multi-wave based circuit design evaluator ("evaluator") 2021. The evaluator propagates compact representations of multiple waveforms throughout nets of a register level circuit design representation as previously described. The memory unit 2008 may include one or more functionalities that facilitate storing the look-up tables or other data structures for evaluating a circuit design representation based on representations of multiple waveforms and decomposition of compact multi-waveform representations into sequence of nondeterministic signal transition representations. Any one of these functionalities may be partially (or entirely) implemented in hardware and/or on the processor unit 2004. For example, the functionality may be implemented with an application specific integrated circuit, in logic implemented in the processor unit 2004, in a co-processor on a peripheral device or card, etc. The processor unit 2004 and the memory unit 2008 are coupled to the bus 2012. Although illustrated as being coupled to the bus 2012, the memory unit 2008 may be coupled to the processor unit 2004.

While the embodiments are described with reference to various implementations and exploitations, it will be understood that these embodiments are illustrative and that the scope of the inventive subject matter is not limited to them. In general, techniques for evaluating a register level circuit design representation with compact multi-waveform representations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for evaluating a circuit design using an evaluation tool, the method comprising:
   determining, by a checking unit operating via one or more processors, a first sequence of signal transition representations of a first signal of a first module of a register level circuit design, wherein
      a second module of the register level circuit design comprises the first module, wherein the first module and the second module are arranged in a hierarchical order;
   determining, by the checking unit operating via the one or more processors, a second sequence of signal transition representations of the first signal of the first module;
   propagating, by the checking unit, signal transition representations of a second signal from the second module to the first module using the first signal; and
   determining, by the checking unit operating via the one or more processors, a first mapping between the first sequence and the second sequence, wherein the second sequence is propagated through the first module.

2. The method of claim 1, wherein
   the first sequence is specified for the first signal at a hierarchy level of the first module.

3. The method of claim 1, wherein
   the second sequence is mapped, using a second mapping, from a third sequence of signal transition representations, wherein the third sequence is for propagating the signal transition representations of the second signal from the second module.

4. The method of claim 3, wherein
   the third sequence is mapped from a fourth sequence of signal transition representations, and
   the fourth sequence is specified for the second signal at a hierarchy level of the second module.

5. The method of claim 3, wherein
   the second sequence includes a first clock local to the first module;
   the third sequence includes a second clock local to the second module; and the second mapping maps the first clock to the second clock.

6. The method of claim 3, wherein
the first sequence includes a first mode local to the first module, wherein the first mode selects between the first signal and a third signal;
the second sequence includes a second mode local to the second module, wherein the second mode selects between the second signal and a fourth signal; and
the second mapping maps the first mode to the second mode.

7. The method of claim 1, further comprising:
in response to determining that the first mapping cannot be determined, generating an error indicating that no valid mapping exists between the first sequence and the second sequence; and
propagating the second sequence through the first module.

8. The method of claim 1, further comprising:
determining that the first module is a gray box where the first signal is an input of the first module and a third signal is an output of the first module, wherein the third signal is unspecified; and
generating a third sequence of signal transition representations of the third signal.

9. The method of claim 1, further comprising:
determining that an instance box is a black box where a third signal is an output of the instance box, wherein the third signal is unspecified, and
assigning a sequence that specifies a behavior of the third signal relative to an input signal to the instance box.

10. The method of claim 1, wherein
each signal transition representation represents a non-deterministic transition from a previous signal state to a set of one or more possible signal states.

11. A computer program product for evaluating a circuit design, the computer program product comprising:
a non-transitory computer readable storage medium having program instructions stored thereon, the program instructions comprising
instructions to determine, via a checking unit, a first sequence of signal transition representations of a first signal of a first module of a register level circuit design, wherein
a second module of the register level circuit design comprises the first module, wherein the first module and the second module are arranged in a hierarchical order,
instructions to determine, via the checking unit, a second sequence of signal transition representations of the first signal of the first module,
instructions to propagate, via the checking unit, signal transition representations of a second signal from the second module to the first module using the first signal; and
instructions to determine, via the checking unit, a first mapping between the first sequence and the second sequence, wherein the second sequence is propagated through the first module.

12. The computer program product of claim 11, wherein the first sequence is specified for the first signal at a hierarchy level of the first module.

13. The computer program product of claim 11, wherein the second sequence is mapped, using a second mapping, from a third sequence of signal transition representations, wherein the third sequence is for propagating the signal transition representations of the second signal from the second module.

14. The computer program product of claim 13, wherein the third sequence is mapped from a fourth sequence of signal transition representations, and
the fourth sequence is specified for the second signal at a hierarchy level of the second module.

15. The computer program product of claim 11, further comprising program instructions to,
determine that an instance box is a black box where a third signal is an output of the instance box, wherein the third signal is unspecified, and
assign a sequence that specifies a behavior of the third signal relative to an input signal to the instance box.

16. An apparatus comprising:
a processor; and
a non-transitory computer readable storage medium having stored thereon program instructions executable by the processor the program instructions comprising:
instructions to determine, by a checking unit, a first sequence of signal transition representations of a first signal of a first module of a register level circuit design, wherein
a second module of the register level circuit design comprises the first module, wherein the first module and the second module are arranged in a hierarchical order,
instructions to determine, by the checking unit, a second sequence of signal transition representations of the first signal of the first module
instructions to propagate, by the checking unit, signal transition representations of a second signal to the first module using the first signal; and
instructions to determine, by the checking unit, a first mapping between the first sequence and the second sequence, wherein the second sequence is propagated through the first module.

17. The apparatus of claim 16, wherein
the first sequence is specified for the first signal at a hierarchy level of the first module.

18. The apparatus of claim 16, wherein
the second sequence is mapped, using a second mapping, from a third sequence of signal transition representations, wherein the third sequence is for propagating the signal transition representations of the second signal from the second module.

19. The apparatus of claim 18, wherein
the third sequence is mapped from a fourth sequence of signal transition representations, and
the fourth sequence is specified for the second signal at a hierarchy level of the second module.

20. The apparatus of claim 16, wherein the program instructions further comprise:
instructions to determine that an instance box is a black box where a third signal is an output of the instance box, wherein the third signal is unspecified, and
instructions to assign a sequence that specifies a behavior of the third signal relative to an input signal to the instance box.

* * * * *